US007565551B2

(12) United States Patent
Kirovski

(10) Patent No.: US 7,565,551 B2
(45) Date of Patent: Jul. 21, 2009

(54) ENHANCING SOFTWARE INTEGRITY THROUGH INSTALLATION AND VERIFICATION

(75) Inventor: Darko Kirovski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 10/368,689

(22) Filed: Feb. 19, 2003

(65) Prior Publication Data

US 2004/0162989 A1 Aug. 19, 2004

(51) Int. Cl.
*H04L 9/32* (2006.01)
(52) U.S. Cl. .................. 713/189; 713/176; 713/191; 726/2; 726/4
(58) Field of Classification Search ............ 713/1, 713/2, 188, 194, 176, 189, 191; 380/200, 380/201, 255, 277; 726/2, 4
See application file for complete search history.

(56) References Cited

U.S. PATENT DOCUMENTS

| 4,866,769 | A | | 9/1989 | Karp | |
|---|---|---|---|---|---|
| 5,752,070 | A | * | 5/1998 | Martin et al. | 712/33 |
| 6,091,897 | A | * | 7/2000 | Yates et al. | 717/138 |
| 6,278,791 | B1 | * | 8/2001 | Honsinger et al. | 382/100 |
| 6,507,592 | B1 | * | 1/2003 | Hurvig et al. | 370/503 |
| 6,546,487 | B1 | * | 4/2003 | McManis | 713/169 |
| 6,708,274 | B2 | * | 3/2004 | Herbert et al. | 713/190 |
| 6,757,827 | B1 | * | 6/2004 | Geist | 713/176 |
| 6,785,815 | B1 | * | 8/2004 | Serret-Avila et al. | 713/176 |
| 6,796,489 | B2 | * | 9/2004 | Slater et al. | 235/379 |
| 6,991,156 | B1 | * | 1/2006 | Somers, Jr. | 235/379 |
| 7,028,027 | B1 | * | 4/2006 | Zha et al. | 707/3 |
| 7,036,146 | B1 | * | 4/2006 | Goldsmith | 726/21 |
| 7,107,618 | B1 | * | 9/2006 | Gordon et al. | 726/24 |
| 2002/0095579 | A1 | * | 7/2002 | Yoshiura et al. | 713/176 |
| 2003/0135746 | A1 | * | 7/2003 | Abbott et al. | 713/193 |
| 2004/0025022 | A1 | * | 2/2004 | Yach et al. | 713/176 |
| 2004/0181756 | A1 | * | 9/2004 | Berringer et al. | 715/530 |

OTHER PUBLICATIONS

Choi, et al.; "A New Stack Buffer Overflow Hacking Defense Technique with Memory Address Confirmation". K. Kim (Ed): ICICS 2001, LNCS 2288, pp. 146-159, 2002.
Weber, et al.; "A Case Study in Detecting Software Security Vulnerabilities Using Constraint Optimization". Proceedings First IEEE International Workshop on Source Code Analysis and Manipulation, pp. 1-11; Nov. 2001.
Larochelle, et al.; "Statically Detecting Likely buffer Overflow Vulnerabilities"; USENIX Security Symposium; pp. 177-189; Aug. 2001.
Wagner, et al; "A First Step Towards Automated Detection of Buffer Overrun Vulnerabilities"; Feb. 2000; University of California, Berkeley.
Cowan, et al.; "StackGuard: Automatic Adaptive Detection and Prevention of Buffer-Overflow Attacks"; USENIX Security Symposium,; pp. 63-77, Jan. 1998.

* cited by examiner

*Primary Examiner*—Kimyen Vu
*Assistant Examiner*—Joseph Pan
(74) *Attorney, Agent, or Firm*—Lee & Hayes, PLLC

(57) ABSTRACT

One or more instructions of software being installed on a computing device are modified to embed a digital signature in the installed software. The installed software is stored on the computing device so that it can be executed on the computing device in a trusted mode if the signature is verified, and so that it can also be executed on the computing device without additional modification in a public mode where the signature is not verified.

25 Claims, 17 Drawing Sheets

370 ⬇

| Instructions | | Possible Positions | | | | | |
|---|---|---|---|---|---|---|---|
| | | (1) | (2) | (3) | (4) | (5) | (6) |
| (A) | 0x0080e0 LDR r1,[r8,#0] | IP | PP | CP | NP | NP | NP |
| (B) | 0x0080e4 LDR r0,[r9,#0] | PP | IP | CP | NP | NP | NP |
| (C) | 0x0080e8 MOV r3,r5 | PP | PP | IP | PP | PP | PP |
| (D) | 0x0080ec MUL r2,r0,r1 | NP | NP | CP | IP | NP | NP |
| (E) | 0x0080f0 MOV r1,#1 | NP | NP | NP | CP | IP | PP |
| (F) | 0x0080f4 LDR r0,[r6,#0] | NP | NP | NP | CP | PP | IP |

400

| Control Step | Available Instructions | | | | Part of Bit Stream Used | Selected Instruction |
|---|---|---|---|---|---|---|
| encoding | 00 | 01 | 10 | 11 | | |
| 1 | (A) | (B) | (C) | - | 10 | (C) |

| Control Step | Available Instructions | | | | Part of Bit Stream Used | Selected Instruction |
|---|---|---|---|---|---|---|
| encoding | 00 | 01 | 10 | 11 | | |
| 1 | (A) | (B) | (C) | - | 10 | (C) |
| 2 | (A) | (B) | - | - | 1 | (B) |

| Control Step | Available Instructions | | | | Part of Bit Stream Used | Selected Instruction |
|---|---|---|---|---|---|---|
| encoding | 00 | 01 | 10 | 11 | | |
| 1 | (A) | (B) | (C) | - | 10 | (C) |
| 2 | (A) | (B) | - | - | 1 | (B) |
| 3 | (A) | (D)* | - | - | - | (A) |

| Control Step | Available Instructions | | | | Part of Bit Stream Used | Selected Instruction |
|---|---|---|---|---|---|---|
| encoding | 00 | 01 | 10 | 11 | | |
| 1 | (A) | (B) | (C) | - | 10 | (C) |
| 2 | (A) | (B) | - | - | 1 | (B) |
| 3 | (A) | (D)* | - | - | - | (A) |
| 4 | (D) | (E)* | (F)* | - | - | (D) |

402 ⟶ (encoding row)

| Control Step | Available Instructions | | | | Part of Bit Stream Used | Selected Instruction |
|---|---|---|---|---|---|---|
| encoding | 00 | 01 | 10 | 11 | | |
| 1 | (A) | (B) | (C) | - | 10 | (C) |
| 2 | (A) | (B) | - | - | 1 | (B) |
| 3 | (A) | (D)* | - | - | - | (A) |
| 4 | (D) | (E)* | (F)* | - | - | (D) |
| 5 | (E) | (F) | - | - | 0 | (E) |

402 ⟶ (encoding row)

*Fig. 11E*

| 1 | 0x00b154 | LDR | r3,[r2],#2 |
|---|---|---|---|
| 2 | 0x00b158 | LDR | r12,[r1,#0] |
| 3 | 0x00b15c | ADD | r3,r3,r12 |
| 4 | 0x00b160 | STRB | r3,[r1,#0] |
| 5 | 0x00b164 | MOV | r2,r2,ASR #8 |
| 6 | 0x00b168 | STRB | r2,[r1,#1] |
| 7 | 0x00b16c | CMP | r0,#0x40 |
| 8 | 0x00b170 | BLT | 0xb154 |
| 9 | 0x00b174 | MOV | pc,r14 |
| 10 | 0x00b178 | STMDB | r13!,{r4,r5,r14} |
| 11 | 0x00b17c | MOV | r14,#0x800 |
| 12 | 0x00b180 | SUB | r14,r14,#1 |
| 13 | 0x00b184 | MVN | r7,r14 |
| 14 | 0x00b188 | LDR | r6,[r0,r2,LSL #1] |
| 15 | 0x00b18c | CMP | r6,r14 |
| 16 | 0x00b190 | BGT | 0xb1b8 |

*Fig. 15A*

| 1 | r6, r7, r3, r12 |
|---|---|
| 2 | r7, r3, r12 |
| 3 | |
| 4 | |
| 5 | r3, r2, r12 |
| 6 | |
| 7 | |
| 8 | |
| 9 | |
| 10 | |
| 11 | r2, r12, r14 |
| 12 | |
| 13 | r12, r14 |
| 14 | r14 |
| 15 | |
| 16 | |

*Fig. 15B*

| 1 | 0x00b154 | LDR | r6,[r2],#2 |
|---|---|---|---|
| 2 | 0x00b158 | LDR | r7,[r1,#0] |
| 3 | 0x00b15c | ADD | r6,r6,r12 |
| 4 | 0x00b160 | STRB | r6,[r1,#0] |
| 5 | 0x00b164 | MOV | r3,r2,ASR #8 |
| 6 | 0x00b168 | STRB | r3,[r1,#1] |
| 7 | 0x00b16c | CMP | r0,#0x40 |
| 8 | 0x00b170 | BLT | 0xb154 |
| 9 | 0x00b174 | MOV | pc,r14 |
| 10 | 0x00b178 | STMDB | r13!,{r4,r5,r14} |
| 11 | 0x00b17c | MOV | r2,#0x800 |
| 12 | 0x00b180 | SUB | r2,r2,#1 |
| 13 | 0x00b184 | MVN | r12,r2 |
| 14 | 0x00b188 | LDR | r14,[r0,r3,LSL #1] |
| 15 | 0x00b18c | CMP | r14,r2 |
| 16 | 0x00b190 | BGT | 0xb1b8 |

```
┌─────────────────────────────────────────────┐
│ IDENTIFY CONDITIONAL BRANCH INSTRUCTIONS IN THE │─ 502
│           ATOMIC EXECUTION UNIT              │
└─────────────────────────────────────────────┘
                      │
                      ▼
┌─────────────────────────────────────────────┐
│ FOR EACH CONDITIONAL BRANCH INSTRUCTION, USE │─ 504
│ A BIT OF THE DIGITAL SIGNATURE TO DETERMINE  │
│      WHETHER TO CHANGE THE INSTRUCTION       │
└─────────────────────────────────────────────┘
                      │
                      ▼
┌─────────────────────────────────────────────┐
│ FOR EACH CONDITIONAL BRANCH INSTRUCTION THAT │─ 506
│  IS TO BE CHANGED, REDIRECT BRANCHES AS      │
│   NECESSARY TO MAINTAIN EXECUTION FLOW       │
└─────────────────────────────────────────────┘
```

*Fig. 16*

ENHANCING SOFTWARE INTEGRITY THROUGH INSTALLATION AND VERIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to software integrity, and particularly to enhancing software integrity through installation and verification.

BACKGROUND

Preventing execution of unauthorized software on a computing system is an essential part of system security. Currently, most computing systems rely on the operating system and basic cryptographic primitives to provide security features that ensure data, program, and execution flow authenticity and integrity. Unfortunately, the complexity of modern operating systems and the fact that an adversary oftentimes needs only a single unprotected entry point to gain control over a system, have made malicious code into a common security problem on all systems that allow incoming traffic from distrusted sources (such as the Internet).

A key problem in such systems is that although a program at the beginning of execution may be verified as authentic, while running its execution flow can be redirected to externally inject malicious code using, for example, a buffer overflow (also referred to as a buffer overrun) exploit. Once the adversary executes injected code in the highest trust-priority mode of the system, usually all system resources are at his or her disposal. In that case, the possibility for malicious actions is fairly broad, such as: destruction (e.g., disk formatting, deleting files), replication (e.g., Internet worms), network traffic analysis (e.g., packet sniffing), covert communication (e.g., Trojan horses), and so forth. The ease with which attacks that focus on redirecting program execution as well as their effectiveness have established such attacks as a common threat to system security.

Thus, it would be beneficial to provide a way to improve computer system security.

SUMMARY

Enhancing software integrity through installation and verification is described herein.

In accordance with one aspect, one or more instructions of software being installed on a computing device is modified to embed a digital signature in the installed software. The installed software is stored on the computing device so that it can be executed on the computing device in a trusted mode if the signature is verified, and so that it can also be executed on the computing device without additional modification in a public mode where the signature is not verified.

BRIEF DESCRIPTION OF THE DRAWINGS

The same numbers are used throughout the document to reference like components and/or features.

FIGS. 11A, 11B, 11C, 11D, and 11E illustrate the selection of the instructions of FIG. 9 for each of the six positions in the block.

FIGS. 15A, 15B, and 15C illustrate an example of the permutation of register assignment constraint type.

FIG. 16 is a flowchart illustrating an exemplary process for embedding a portion of a digital signature in an atomic execution unit using the conditional branch selection constraint type.

DETAILED DESCRIPTION

Enhancing software integrity through installation and verification as described herein is directed to making computing systems more secure through intrusion prevention. The intrusion prevention improves security of a computer by forcing an adversary to solve a computationally difficult task in order to create a binary that can execute on the computer.

Figure 1:
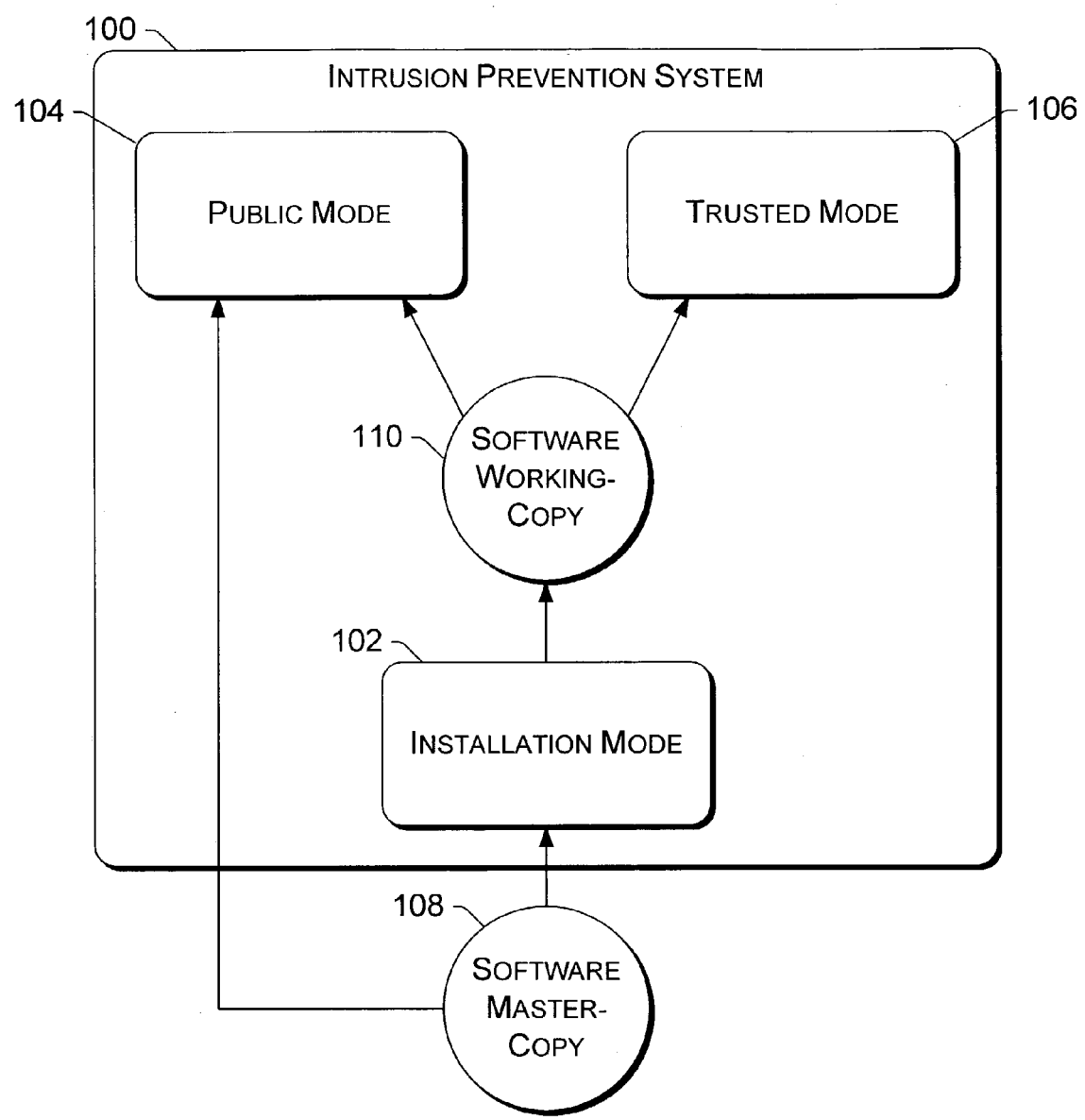
FIG. 1 is a block diagram illustrating an exemplary intrusion prevention system.

FIG. 1 is a block diagram illustrating an exemplary intrusion prevention system 100. Intrusion prevention system 100 is implemented on a computing device and includes an installation mode 102, a public mode 104, and a trusted mode 106. Installation mode 102 is used to install software 108 on the computing device as installed software 110. Prior to installation on the computing device, the software is also referred to as the "master-copy", and after being installed on the computing device the software is also referred to as the "working-copy". When installing software 108 on the computing device, one or more constraints are embedded in the software working-copy 110. The embedded constraints tie or associate the software working-copy 110 to the particular computing device on which the software is installed.

Various trusted resources of the computing device are available only to processes executing in trusted mode 106. Trusted resources can be hardware resources (e.g., regions of memory, storage components, communications components, co-processors, etc.) and/or software resources (e.g., portions of the operating system, portions or the entirety of other application programs, dynamically linked libraries (DLLs), component object models (COMs), etc.). The specific trusted resources in a particular computing device can vary based on the desires of the manufacturer (and/or user or system administrator) of the computing device and/or of the manufacturer (and/or user or system administrator) of software to be executed on the computing device (e.g., the operating system). These trusted resources of the computing device, however, are not available to processes executing in public mode 104.

The manner in which the computing device protects these trusted resources can vary based on the processor(s) and/or other hardware of the computing device as well as the operating system of the computing device. Any of a variety of conventional techniques can be used to protect these trusted resources. The present disclosure is directed towards how particular software can be identified and verified as being trusted (and thus, for example, allowed access to the trusted resources).

In trusted mode 106, only trusted software can be executed. During execution of software in trusted mode 106, verification of the software is performed to ensure that the software has not been altered since installation.

However, any software can be executed in public mode 104. No verification of the software is performed in public mode 104. So, contrary to trusted mode 106, there is no assurance that the software has not been altered since installation when executed in public mode 104.

Installed software 110 can be executed in public mode 104 or trusted mode 106. However, verification of the software as it is executed is performed only when the software is executed in trusted mode 106. Additionally, software 108 that has not been installed on the computing device via installation mode 102 can be executed in public mode 104, but cannot be executed in trusted mode 106.

Figure 2:
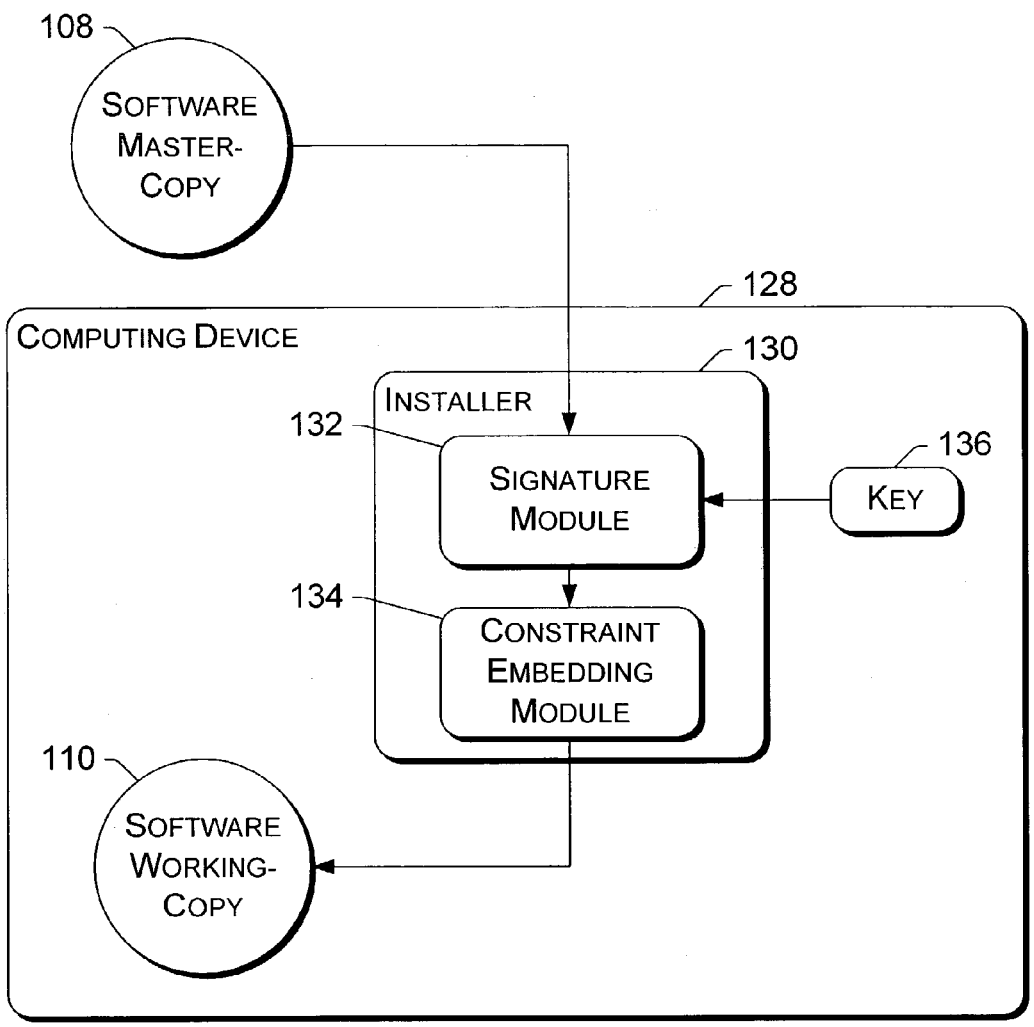
FIG. 2 is a block diagram illustrating the installation of software on a computing device.

FIG. 2 is a block diagram illustrating the installation of software on a computing device 128. An installer 130 includes a signature module 132 and a constraint embedding module 134. When operating in installation mode 102 (of FIG. 1) to install software master-copy 108, installer 130 separates software master-copy 108 into multiple blocks or groups of instructions. Each such block or group of instructions is also referred to herein as an atomic execution unit. The instructions of an atomic execution unit are typically sequential instructions, although different groupings may alternatively be used.

In one implementation an atomic execution unit is made up of 64 instructions or 128 instructions. Alternatively, atomic execution units may be made up of greater or fewer instructions. In one implementation, the number of instructions in an atomic execution unit is based on some other characteristic of the computing device's processor(s). For example, the number of instructions in an atomic execution unit may be the same as the number of instructions in a cache line used by the processor, the same as the number of instructions in a pre-fetch buffer of the processor, and so forth.

Additionally, each atomic execution unit for a particular software master-copy may include the same number of instructions, or alternatively may include different numbers of instructions. For example, all atomic execution units for a particular software master-copy may be made up of 64 instructions, or alternatively some may be made up of 64 instructions while others are made up of 128 instructions.

Each atomic execution unit is digitally signed by signature module 132 based on a key 136. Signature module 132 digitally signs an atomic execution unit using any one or more of a variety of cryptographic hash functions (also referred to as one-way hash functions), such as SHA1 (Secure Hash Algorithm 1), MD5 (Message Digest 5), etc. The result of applying a cryptographic hash function to the atomic execution unit is a digital signature, which is a sequence of bits (e.g., a 64-bit or 128-bit sequence, although digital signatures may include greater or fewer bits). The nature of cryptographic hash functions is that any change to the data being signed (e.g., any change to the atomic execution unit) will result in a different digital signature. So, cryptographic hash functions can be used to verify that the data (e.g., the atomic execution unit) has not been tampered with after being digitally signed.

Alternatively, the digital signature generated by signature module 132 can be a keyed MAC (Message Authentication Code) that is keyed to key 136. In yet another alternative, signature module 132 may implement a two-phase process to generate the digital signature. In the first phase, a non-cryptographic hash function is used to generate a hash value for the atomic execution unit. In the second phase, the hash value generated in the first phase is encrypted using a cipher keyed with key 136. Any of a variety of ciphers can be used in this second phase, such as triple-DES (Data Encryption Standard), AES (Advanced Encryption Standard), DSA (Digital Signature Algorithm), elliptic curve cryptosystems, RSA (Rivest, Shamir, Adleman), and so forth.

The digital signature generated by constraint embedding module 134 for an atomic execution unit is embedded in the atomic execution unit as a constraint. Different portions of the digital signature can be embedded in an atomic execution unit in different manners as different constraints. Additionally, it should be noted that the digital signatures generated for each atomic execution unit are constraint-invariant. In other words, even though constraints (portions of a digital signature) are embedded in an atomic execution unit, the digital signature of the atomic execution unit remains the same (the digital signature before embedding the constraints and after embedding the constraints is the same).

The manner in which this constraint-invariance is obtained varies based on the manner in which the constraint is embedded in the atomic execution unit. Generally, a constraint is embedded by generating a digital signature using only the "constant" portion(s) or aspects of the atomic execution unit—any portion(s) or aspects of the atomic execution unit that may be altered due to embedding the constraint are not included when generating the digital signature. This process of selecting the "constant" portions) or aspects of the atomic execution unit is also referred to as domain ordering. Examples of embedding constraints in the atomic execution units are discussed in more detail below.

Key 136 is a secret key that is maintained at the computing device and is used to perform the intrusion prevention discussed herein. Different computing devices have different secret keys, so by digitally signing the atomic execution units using its key 136, a particular computing device is able to tie those atomic execution units to that particular computing device. In one implementation, key 136 is included in the CPU of the computing device (e.g., during the process of manufacturing the CPU). In alternate implementations, key 136 can be included in other components of the computing device, such as in a security processor or co-processor or other chip of the computing device. In yet other alternate implementations, portions of key 136 can be in multiple locations (e.g., part of key 136 may be included in the CPU and another part of key 136 may be included in a security processor).

In one implementation, all of the instructions in software master-copy 108 are part of at least one atomic execution unit. A digital signature is generated by signature module 132 for each atomic execution unit of software master-copy 108, SO an alteration to any one of the instructions in software working-copy 110 can be detected (due to the resultant change in the signature of the atomic execution unit that the altered instruction is part of). Alternatively, certain groups of instructions in software master-copy 108 may not be part of an atomic execution unit, however, in this alternative the system can be less secure as changes to any of the instructions in that group would not be detected.

For each atomic execution unit, the digital signature generated by signature module 132 is embedded in the atomic execution unit by constraint embedding module 134. The digital signature constrains the atomic execution unit to the particular computing device on which the software working-copy is installed. Constraint embedding module 134 can embed the digital signature in the atomic execution unit in a variety of different manners.

In one implementation, constraint embedding module 134 embeds the digital signatures in the atomic execution units by adding the digital signature for each atomic execution unit into the atomic execution unit and also adding a "jump" instruction (e.g., an unconditional branch instruction) to skip over the signature (thus, no attempt will be made to execute the signature as if it were an instruction). The digital signature can be added to any portion of the atomic execution unit (e.g., the beginning of the atomic execution unit, the ending of the atomic execution unit, somewhere in the middle of the atomic execution unit, and so forth).

Figure 3A:
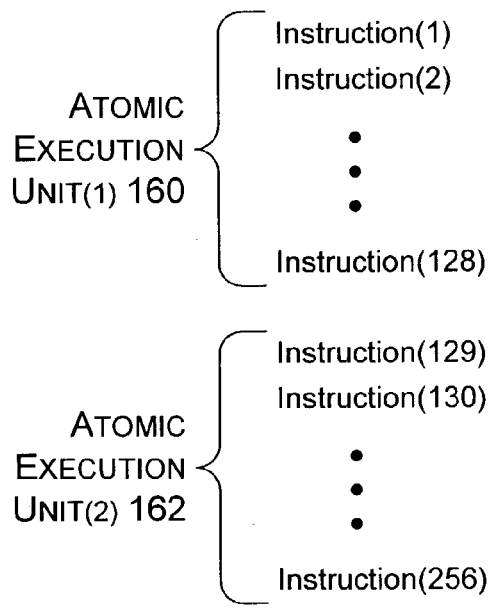
FIGS. 3A and 3B illustrate an example of using a jump instruction to embed a signature in an atomic execution unit.
Figure 3B:
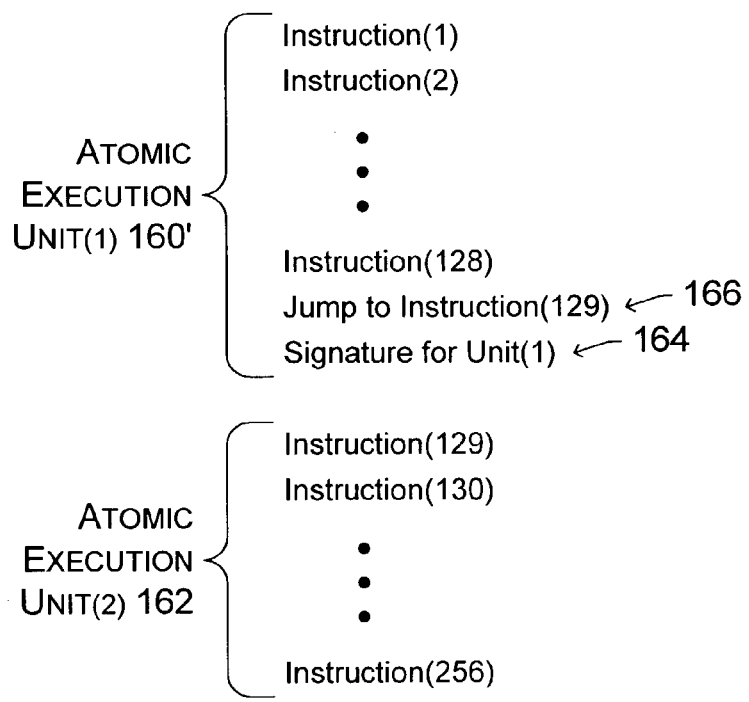

FIGS. 3A and 3B illustrate an example of using a jump instruction to embed a signature in an atomic execution unit. FIG. 3A illustrates two atomic execution units 160 and 162, each including 128 instructions, from software master-copy 108 of FIG. 2. Assume in the example of FIGS. 3A and 3B that, when executed, the execution flow is from instruction (128) of atomic execution unit(1) 160 to instruction(129) of atomic execution unit(2) 162. During installation, signature module 132 generates a digital signature 164 for atomic execution unit(1) 160 and constraint embedding module 134 adds the digital signature 164 to the atomic execution unit to generate atomic execution unit(1) 160' of FIG. 3B. In order to ensure that the CPU of the computing device, when executing atomic execution unit(1) 160', does not interpret the bits of digital signature 164 as an instruction and attempt to execute those bits, a jump instruction 166 is added to atomic execution unit(1) 160' that causes the CPU to jump to instruction(129) of atomic execution unit(2) 162.

As illustrated in FIGS. 3A and 3B, when embedding constraints by adding a digital signature and "jumping" over the digital signature, an additional instruction as well as the bits of the digital signature are added to each atomic execution unit. Thus, the size of the atomic execution unit is increased during the installation process.

Alternatively, rather than allowing the CPU of the computing device to execute the jump instruction 166, the jump instruction 166 and signature 164 may be removed from the atomic execution unit after verification of the atomic execution unit but prior to execution of the instructions. By way of example, the verifier (discussed in more detail below), may use the signature 164 to verify that the atomic execution unit has not been altered, and then pass the atomic execution unit (but without the jump instruction 166 and signature 164) to the CPU for execution. It should be noted that, if the jump instruction 166 and signature 164 are to be removed from the atomic execution unit after verification of the atomic execution unit but prior to execution of the instructions, then the jump instruction 166 need not be included in the atomic execution unit in order for the software working-copy 110 to be executed in trusted mode. If the software working-copy 108 is to be executed in public mode, then the jump instruction 166 is still included.

In other implementations, rather than adding the digital signature and a jump instruction as illustrated in FIGS. 3A and 3B, other constraint embedding processes can be used to embed the digital signature in the atomic execution unit. Examples of such additional constraint embedding processes are discussed in more detail below.

Figure 4:
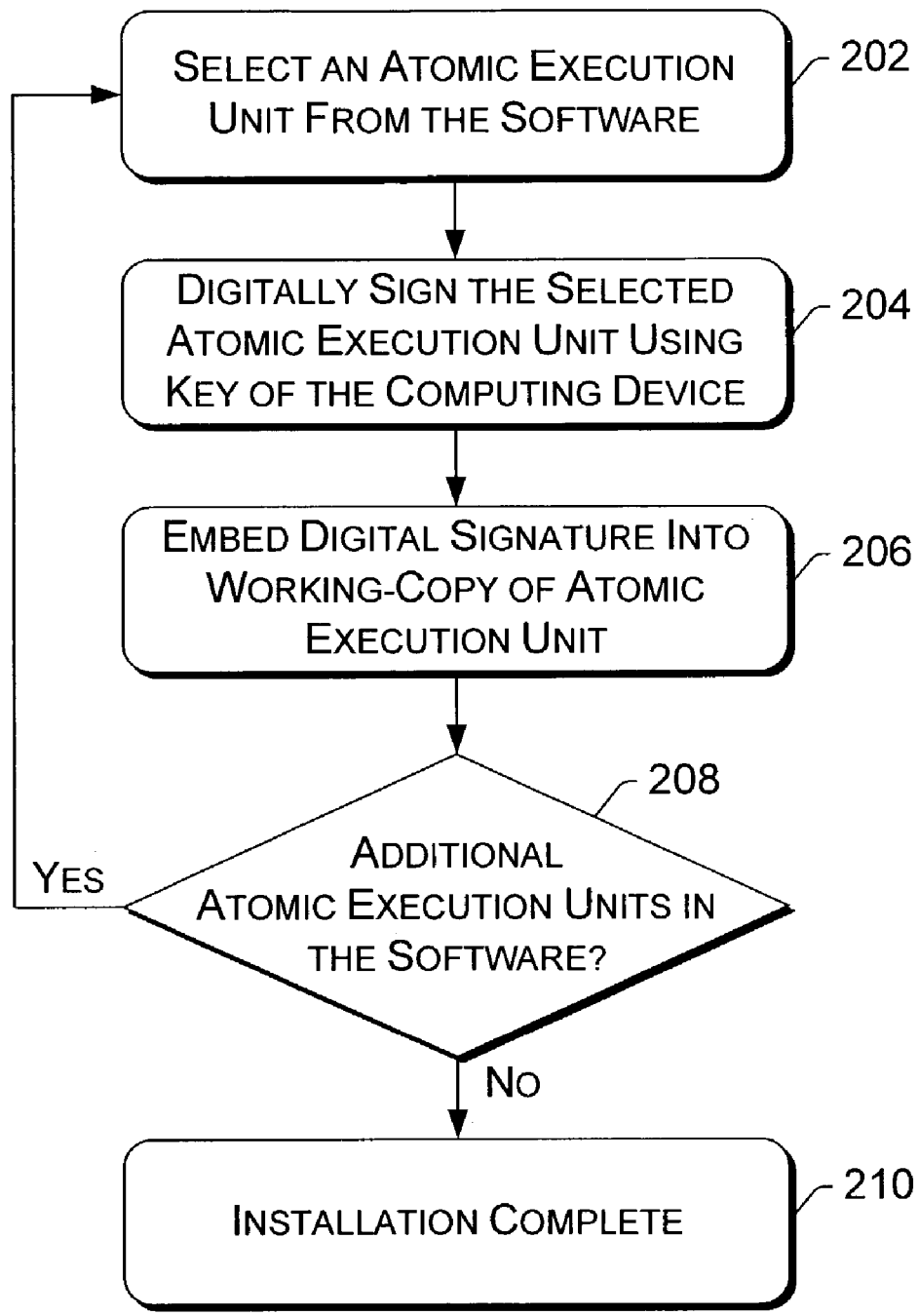
FIG. 4 is a flowchart illustrating an exemplary process for installing software on a computing device.

FIG. 4 is a flowchart illustrating an exemplary process 200 for installing software on a computing device. In one implementation, process 200 is performed by installer 130 of FIG. 2, and may be implemented in hardware, software, firmware or combinations thereof.

Initially, an atomic execution unit is selected from the software master-copy being installed (act 202). Atomic execution units may be selected from the software master-copy in any order (e.g., sequentially starting with the first instructions in the software master-copy, sequentially starting with the last instructions in the software master-copy, randomly, etc.). The selected atomic execution unit is then digitally signed using a key of the computing device (act 204) and the digital signature is embedded in the atomic execution unit (act 206).

A check is then made as to whether there are any additional atomic execution units in the software master-copy that have not yet been selected (act 208). If there is at least one additional atomic execution unit in the software master-copy that has not yet been selected, then the process returns to act 202 to select one of the remaining atomic execution unit(s). However, if all atomic execution units in the software master-copy have been selected, then the installation of the software is complete (act 210).

It should be noted that additional conventional processes may also be performed as part of the process of installing software master-copy 108 on a computing device. For example, one or more files may be decompressed, information in an operating system registry may be added or changed, folders or directories on a storage device (e.g., hard disk) may be created, and so forth.

Returning to FIG. 2, care should be taken so that the installation of software performed by installer 130 is a secure procedure. In particular, care should be taken so that key 136 is not revealed outside of installer 130, and thus not revealed to any adversary. Installation mode 102 operates to keep key 136 secret from software attacks and from most hardware attacks. In certain embodiments, installation mode 102 does this by adhering to the following three rules:

(1) installation is executed atomically (without any interruptions)—CPU interrupts are disabled during installation;

(2) installer 130 does not write key 136 or any other variable that discloses one or more bits of key 136 off chip (the chip that installer 130 is implemented on); and (3) before completion of the installation procedure, installer 130 overwrites any intermediate results or variables stored in memory (e.g., the state of any registers and/or memory used by installer 130 is cleared so that it is not accessible to processes after the installation procedure is complete).

Installation mode 102 can be entered in different manners. In one implementation, installation mode 102 is entered by invoking installer 130 as follows. First, the arguments to the software installer are fetched to a predetermined and fixed address in the main memory. These arguments include the location and size of the input software master-copy, the location where the software working-copy should be stored, and optionally a password that enables only an authorized party to install the software. The password can be entered by a user (e.g., an alphanumeric sequence) or alternatively by another device (e.g., from a smart card or other integrated circuit device). Following the principles of traditional password systems, the hash of this password is stored on-chip in nonvolatile memory (e.g., flash memory). Before proceeding, the CPU checks whether the hash of the entered password is the same as the stored hash. If the hashes are the same then the installation process continues; otherwise, the installation process is terminated and installer 130 does not install the software.

Because installer 130 operates in a single process mode, physical rather than virtual addresses are used. Thus, the operating system of the computing device forwards to installer 130 the physical addresses of the source buffer (the location and size of the input software master-copy) and of the destination buffer (the location where the software working-copy should be stored). In one implementation, if the operating system is not installed, then installer 130 assumes certain default values for its arguments.

Additionally, the calling procedure disables all soft and hard interrupts on the CPU before invoking installer 130. Hardware can verify that key 136 is accessible only if all interrupts are disabled. Alternatively, the CPU can have hardware support to buffer interrupts while in installation mode 102. This also prohibits context switching on the CPU during software installation. Disabling all soft and hard interrupts on the CPU is important for preventing possible leakage of secrets or other types of manipulations by adversaries.

Next, the program counter is redirected to the memory address where installer 130 is located. In this implementation, installer 130 is a program that can be stored on-chip in read-only memory or externally. If stored externally, the content of the external read-only memory is validated using a cryptographic hash within the CPU prior to loading the first instruction of installer 130. In this situation, the expected value of the hash is stored in the CPU.

Figure 5:
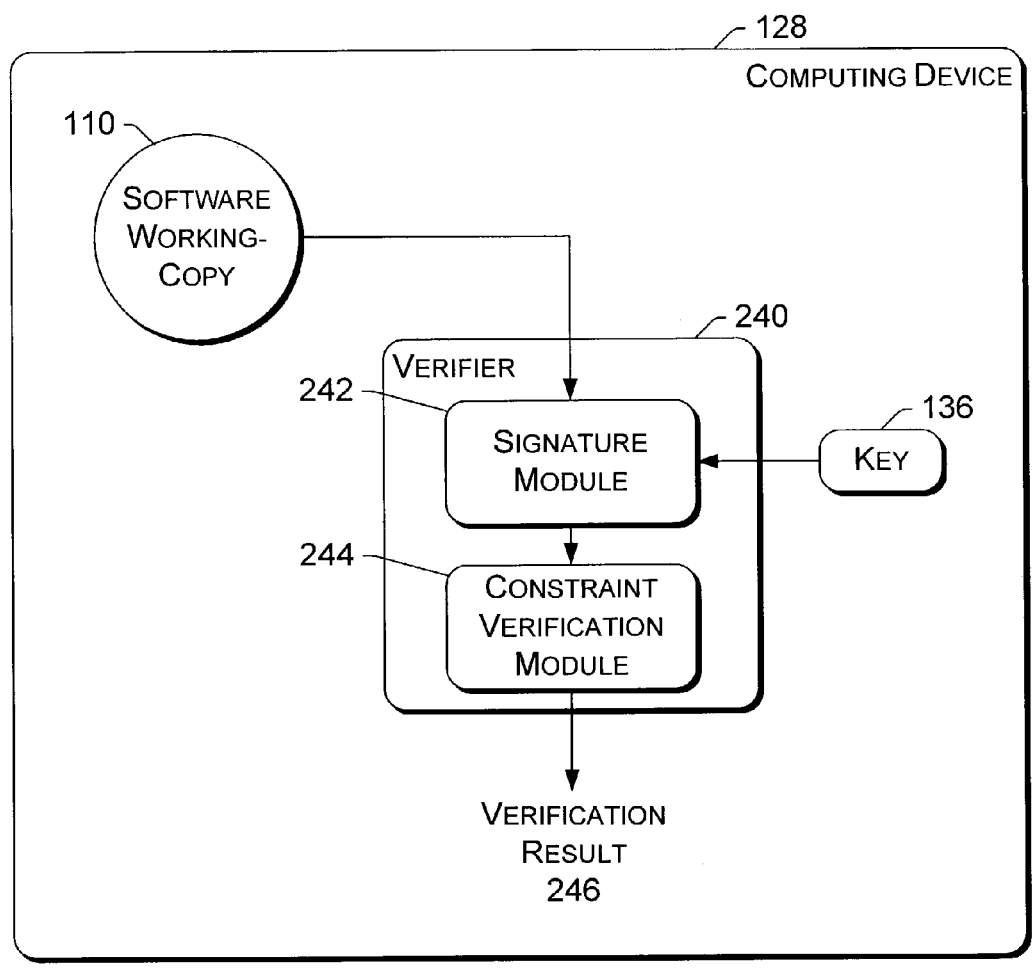
FIG. 5 is a block diagram illustrating the verification of software executing in a trusted mode on a computing device.

FIG. 5 is a block diagram illustrating the verification of software executing in a trusted mode on a computing device 128. A verifier 240 includes a signature module 242 and a constraint verification module 244. When software master-copy 108 is executed, instructions that are fetched by the CPU for execution are first passed through verifier 240. Verifier 240 operates on an atomic execution unit basis, so when an instruction from an atomic execution unit is fetched the entire atomic execution unit is obtained by verifier 240 and verified.

Signature module 242 generates a digital signature for an atomic execution unit being verified based on key 136. Signature module 242 generates the digital signature in the same manner as signature module 132 of installer 130 of FIG. 2, so if the atomic execution unit has not been altered since it was installed on computing device 128 then the signature generated by signature module 242 will be the same as the signature generated by signature module 132 and embedded in the atomic execution unit by installer 130.

Typically, key 136 is a symmetric key that is kept secret by computing device 128. Although in principle the digital signature could be based on public key cryptography, care should be taken to ensure that the digital signature is generated by installer 130 of FIG. 2 and not some other component, module, or device that has knowledge of the public key of the computing device. Such an assurance could be provided, for example, by having a digital certificate digitally signed by installer 130 and embedded in the atomic execution unit along with (and in the same manner as) the digital signature.

Constraint verification module 244 extracts the digital signature (constraint) embedded in the atomic execution unit. The exact manner in which the digital signature is extracted from the atomic execution unit can vary based on how the digital signature was embedded in the atomic execution unit. It should be noted that, in certain embodiments, even though the digital signature is extracted from the atomic execution unit the digital signature remains embedded in the atomic execution unit (e.g., so that it can be used to verify the atomic execution unit when the software is again executed). As discussed above, the digital signature generation is constraint-invariant. Referring to FIGS. 3A and 3B as an example, when generating the digital signature for verification, constraint verification module 244 uses the instructions of atomic execution unit(1) 160' of FIG. 3B that were not changed by addition of the digital signature to atomic execution unit(1) 160' (in other words, the instructions of atomic execution unit(1) 160' except for the jump instruction 166 and the signature 164).

Given the digital signature extracted from the atomic execution unit, constraint verification module 244 compares the extracted digital signature to the digital signature generated by signature module 242 and outputs a verification result 246. If the two signatures are the same (that is, the bit sequences of the two signatures are identical), then the atomic execution unit is verified as not having been altered since installation. However, if the two signatures are not the same, then verifier 240 assumes that a change has been made to the atomic execution unit and the atomic execution unit is not verified. The computing device (typically the CPU or a security processor) can take any of a wide variety of measures in response to the atomic execution unit not being verified, such as one or more of: 19 signaling an alert to a user or system administrator, terminating execution of the application, shutting or powering down the computer, initiating a system reset, initiating a non-blockable exception, and so forth.

Verifier 240 can be implemented in a variety of different locations. In one implementation, each cache line of the CPU is an atomic execution unit and verifier 240 obtains the atomic execution units for verification from the set of instruction cache lines in the CPU. Instructions are verified by verifier 240 when a new instruction cache line is loaded. In this implementation, if writes to the instruction cache are not possible, then verification is not necessary for repeat accesses to any of the lines in the instruction cache. In another implementation, atomic execution units are verified by verifier 240 when an instruction of the atomic execution unit is read from the instruction cache.

In yet another implementation, an atomic execution unit buffer precedes the instruction cache as a pre-fetch unit. Atomic execution units are pre-fetched by the atomic execution unit buffer, and these atomic execution units are verified by verifier 240 before being passed to the instruction cache.

Additionally, different units in the CPU, such as an out-of-order execution unit, can be integrated with verifier 240. By way of example, the hardware that supports speculative execution in the CPU can execute instructions from an atomic execution unit before the atomic execution unit is verified, but not commit the results of the instructions until the atomic execution unit is verified by verifier 240.

Care should be taken so that key 136 is not revealed outside of verifier 240, and thus not revealed to any adversary. In one implementation, verifier 240 is implemented in hardware that is not accessible to the CPU, other than to obtain verification result 246. By thus shielding verifier 240 from the CPU, a malicious user or application executing on the CPU cannot access verifier 240 and thus cannot access key 136. Verifier 240 can be implemented, for example, using digital circuitry that is designed to carry out the functionality of verifier 240, or alternatively by a controller or processor that executes microcode (e.g., stored in a read only memory) to control the digital circuitry to perform the functionality of verifier 240.

Figure 6:
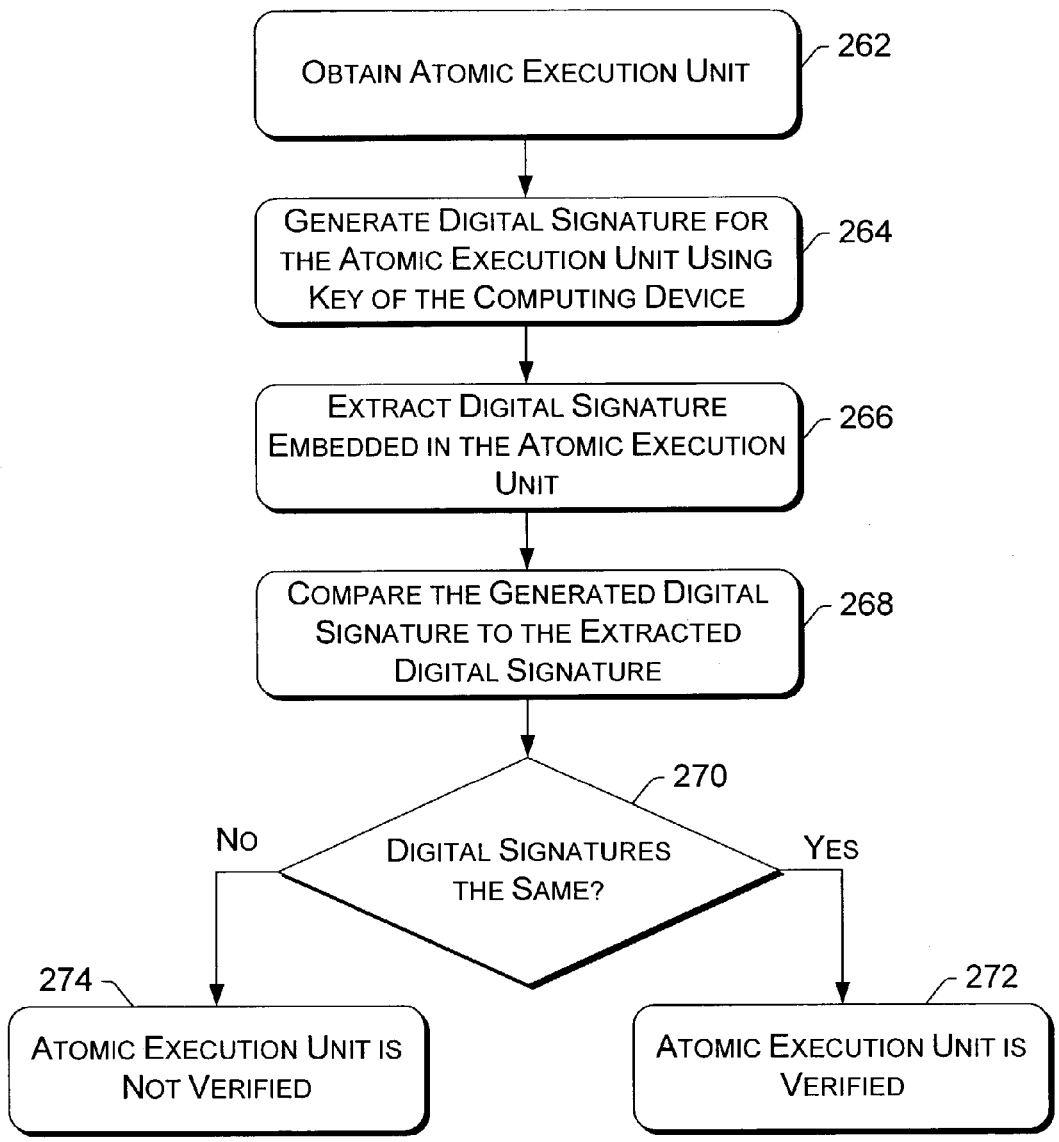
FIG. 6 is a flowchart illustrating an exemplary process for verifying software installed on a computing device.

FIG. 6 is a flowchart illustrating an exemplary process 260 for verifying software installed on a computing device. In one implementation, process 260 is performed by verifier 240 of FIG. 5, and may be implemented in hardware, software, firmware or combinations thereof.

Initially, an atomic execution unit to be verified is obtained (act 262) and a digital signature for the atomic execution unit is generated using a key of the computing device (act 264). A digital signature embedded in the atomic execution unit is extracted (act 266) and compared with the digital signature generated in act 264 (act 268). Process 260 then proceeds based on whether the digital signatures compared in act 268 are the same (act 270). If the two signatures are the same then the atomic execution unit is verified (act 272), indicating that the atomic execution unit has not been altered since it was installed on the computing device. However, if the two signatures are not then same then the atomic execution unit is not verified (act 274), indicating that the atomic execution unit has been altered since it was installed on the computing device.

Any of a variety of different constraint types (also referred to herein as transforms) can be used to embed the digital signature in an atomic execution unit. Examples of constraint types, discussed in more detail below, include: instruction reordering, basic block reordering, permutation of register assignment, conditional branch selection, filling unused instruction fields, and toggling the signs of immediate operands.

In one implementation, the constraint types used to embed the digital signature in an atomic execution unit should satisfy the following conditions:

(1) High degree of freedom. The constraint type should provide a rich domain for code transformation, implying a large number of distinct representations for a given atomic execution unit.
(2) Functional transparency. The induced transformation does not alter the functionality of the program.
(3) Transformation invariance. The constraint type depends exclusively on the functionality of an atomic execution unit and the key 136. Constraint encoding is exactly the same before and after the constraints are embedded in an atomic execution unit. Thus, the induced code transformations due to constraint encoding do not alter the result of domain ordering and hashing.
(4) Effective implementation. The hardware implementation of the constraint verifier should not significantly impact the performance of the software when executed or require a large amount of space on the hardware where it is implemented (e.g., the constraint verifier should be fast and require few silicon gates).
(5) Low performance overhead. The imposed changes due to constraint encoding should have little performance overhead. For example, instruction reordering poses little performance overhead on processors with out-of-order execution, however, it may have a dramatic effect on certain heavily pipelined architectures. In such a case, instruction reordering can be used with certain additional constraint types or not used at all.

The particular constraint types used can vary by implementation. For example, different constraint types can be used for different processors, different processor architectures, different processor instruction sets, and so forth.

When embedding constraints in an atomic execution unit, care should be taken to ensure that the constraint domain can be ordered consistently, as any changes to the atomic execution unit alter the digital signature of the atomic execution unit. In some embodiments, such as those making use of the jump instruction discussed above, the instructions in the atomic execution unit (other than the adding of the jump and the digital signature) are not changed. Thus, so long as the digital signature is generated based on the atomic execution unit but without the jump instruction and digital signature, then the domain will be ordered consistently.

However, in other embodiments, changes may be made to the atomic execution unit when embedding constraints, as discussed in more detail below. Domain ordering is imposed in such embodiments to ensure that any changes made to the atomic execution unit when embedding constraints are accounted for in generating the digital signature. This domain ordering is imposed during installation as well as during verification. By way of example, one constraint type is instruction reordering, which can alter the order of instructions in an atomic execution unit. As this alteration in the order of instructions will change the digital signature, domain ordering is imposed to ensure that the instructions are ordered in a particular manner when generating the digital signature, which may be a different order than the instructions appear in the atomic execution unit. The specific manner in which domain ordering is performed varies based on the constraint type, as discussed in more detail below.

Additionally, reference is made herein to the degree of freedom and entropy of atomic execution units. The degree of freedom of a given atomic execution unit with respect to a given set of constraint types quantifies the number of ways that the atomic execution unit can be transformed such that the functionality (semantics) of the atomic execution unit is preserved. The inverse of degree of freedom is the probability that a random atomic execution unit of instructions (potentially malicious) accidentally (or with malicious intent) satisfies all required constraints considered for constraint embedding. Thus, the degree of freedom fairly accurately models the security of the scheme. For a set of constraint types $S=\{C_1, \ldots, C_n\}$ that are mutually orthogonal (i.e., transformation in one constraint domain does not affect the degree of freedom for another constraint domain), the total degree of freedom $\delta(I,S)$ of an atomic execution unit I equals the product of degree of freedom for each individual constraint type as follows:

$$\delta(I, S) = \prod_{x=1}^{n} \delta(I, C_x)$$

From the perspective of the corresponding entropy H(IS), this can be written as follows:

$$H(I, S) = \sum_{x=1}^{n} H(I, C_x) = -\sum_{x=1}^{n} \log_2\left[\frac{1}{\delta(I, C_x)}\right]$$

where $\delta(I, C_x)$ denotes the number of possible distinct transformations of the atomic execution unit I using the constraint type $C_x$, and n represents the number of different constraint types used to embed the digital signature in the atomic execution unit. The entropy H(I,S) refers to the number of successfully enumerated elements in each of the domains of the constraint types used to embed the digital signature in the atomic execution unit. These domains are discussed in more detail below.

It should be noted that the constraint types need not be truly orthogonal. However, constraints embedded by all transforms considered herein (e.g., instruction reordering, basic block reordering, permutation of register assignment, conditional branch selection, filling unused instruction fields, and toggling the signs of immediate operands) are detected properly so long as the transforms are applied in a particular order (e.g., instruction reordering should be performed before permutation of register assignment).

Instruction Reordering

For the instruction reordering constraint type, data-flow (nonbranch) instructions within the atomic execution unit are reordered in a manner that embeds one or more bits of the digital signature in the atomic execution unit. Although the instructions are reordered, the program functionality is not altered. Instructions are reordered only within basic blocks of an atomic execution unit. A basic block refers to a sequence of instructions that has only one entry and only one exit.

For the instruction reordering constraint type, domain ordering assigns a unique identifier to multiple data-flow (nonbranch) instructions. The domain ordering can be performed independently for each basic block in the atomic execution unit, or alternatively across basic blocks of the atomic execution unit. The domain ordering can be performed in any of a variety of manners, so long as a unique identifier is assigned to each of multiple data-flow instructions. For example, the instructions may be assigned unique identifiers in some form of alpha-numeric order (accounting for both the op-codes and the operands). A unique identifier may be assigned to each of the data-flow instructions in an atomic execution unit, or alternatively to only some of the data-flow instructions.

In one implementation, the data-flow instructions are domain ordered by sorting the instructions with preserved dependencies using the following two criteria: (1) instruction op-code that includes information about the number and indexing of operands, and (2) instruction fan-out. A fan-out of an instruction that sets register r is defined as the XOR (exclusive-or) sum of op-codes of all instructions in the atomic execution unit that use the value in register r as a first operand. If there are no such instructions, then the fan-out equals null. For example, consider the following two instructions:

| | | |
|---|---|---|
| 0x0080e0 | LDR | r1,[r8,#0] |
| 0x0080e4 | LDR | r0,[r9,#0] |

These two instructions cannot be distinctly sorted using the first criteria. However, assume the fan-out of the first instruction is null and the fan-out of the second instruction is the op-code of the MUL instruction. This distinction is used to sort these two instructions. In one implementation, if a certain instruction(s) in the basic block cannot be sorted distinctly (that is, the instruction(s) cannot be assigned unique identifiers), then they are not considered in the instruction reordering constraint type.

Table I illustrates exemplary pseudo-code for ordering the domain of the instruction reordering constraint type. Function arg$\{i, L_x\}$ returns the index of instruction i in a sorted list $L_x$. The index of the first element in the list equals zero. Instructions that cannot be distinctly sorted have equal, smallest possible, indices. ID(i) is the resulting instruction identifier.

Figure 7:
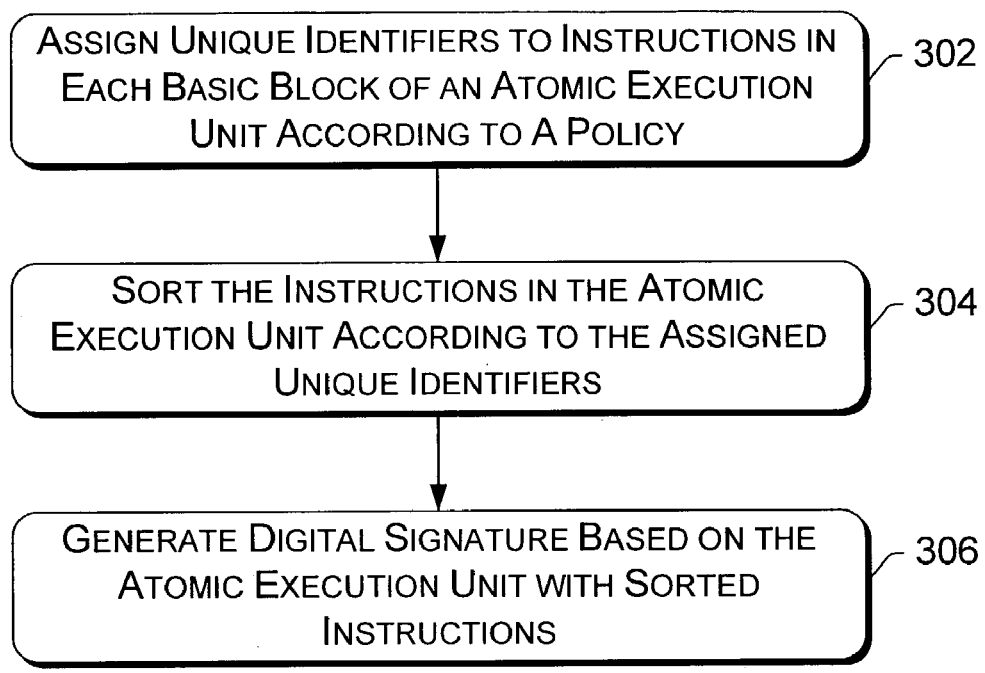
FIG. 7 is a flowchart illustrating an exemplary process for domain ordering instructions when using the instruction reordering constraint type.

TABLE I for each basic block B
   $L_1$ = sort B in decreasing order of op-codes
   Set ( $\forall i \in$ B)ID(i) = arg $\{i, L_1\}$
   for each subset of instructions b $\in$ B with $\forall i \in$ b| arg $\{i, L_1\}$ = const.
      $L_2$ = sort b in decreasing order of fan-out
      Set ( $\forall i \in$ b)ID(i) = ID(i) + arg $\{i, L_2\}$ FIG. 7 is a flowchart illustrating an exemplary process 300 for domain ordering instructions when using the instruction reordering constraint type. In one implementation, process 300 is performed by installer 130 of FIG. 2 or verifier 240 of FIG. 5, and may be implemented in hardware, software, firmware or combinations thereof.

Initially, unique identifiers are assigned to instructions in each basic block of an atomic execution unit according to some policy (act 302). The instructions in the atomic execution unit are then sorted according to the unique identifiers assigned in act 302 (act 304). A digital signature for the atomic execution unit is then generated based on the atomic execution unit with the sorted instructions (act 306).

Thus, it can be seen from process 300 that regardless of how instructions are ordered within the atomic execution unit, the digital signature remains the same because the instructions are ordered according to their assigned unique identifiers before generating the digital signature for the atomic execution unit.

In order to embed at least a portion of the digital signature in the atomic execution unit when installing the software, constraint embedding module 134 selects, based on that at least a portion of the digital signature, one from the possible permutations of instruction orderings of a basic block of the atomic execution unit that preserve the functionality of the basic block. Constraint embedding module 134 then reorders the instructions in the basic block according to this selected instruction order. Reordering of instructions is also referred to as rescheduling instructions. Constraint embedding module 134 builds the ordering by selecting a specific instruction from a pool of instructions that can be executed at a particular control step. Which instructions can be executed at a particular control step is determined based on the data-flow dependencies of the instructions in the basic block.

Figure 8:
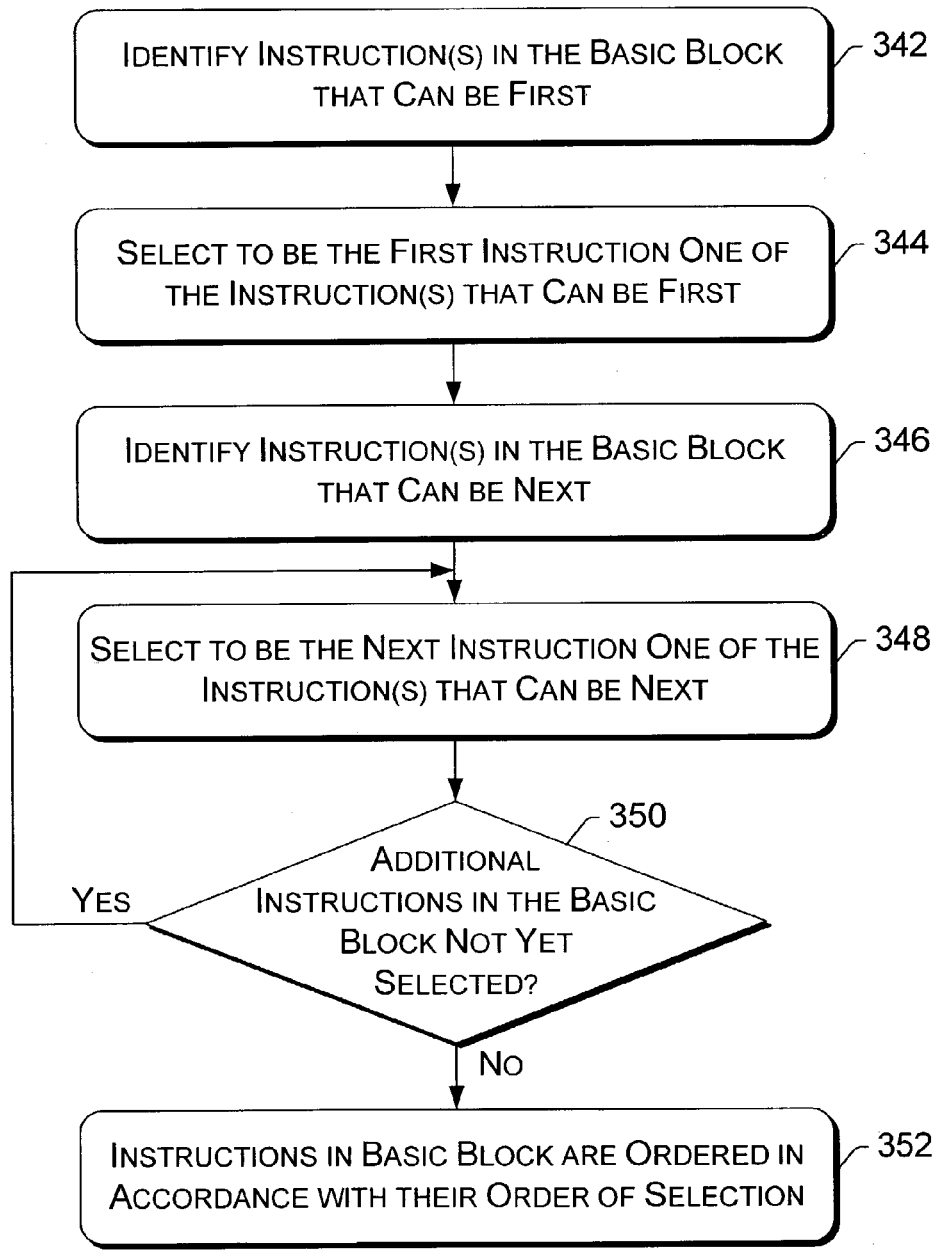
FIG. 8 is a flowchart illustrating an exemplary process for selecting an instruction ordering for a basic block.

FIG. 8 is a flowchart illustrating an exemplary process 340 for selecting an instruction ordering for a basic block. In one implementation, process 340 is performed by installer 130 of FIG. 2, and may be implemented in hardware, software, firmware or combinations thereof.

Initially, one or more instructions in the basic block that can be first in the basic block are identified (act 342). The instruction that is first in the basic block as the basic block exists in the software master-copy (e.g., as the basic block was written) can always be first. In addition, it is possible that one or more other instructions can also be first based on the data-flow dependencies of the instructions in the basic block. One of the instructions that can be first (as identified in act 342) is then selected to be the first instruction (act 344). In situations where a pool of multiple instructions can be first, at least a portion of the digital signature is used to select which of the pool of instructions is to be the first instruction.

After the first instruction is selected, one or more instructions in the basic block that can be next in the basic block are identified (act 346). Given the data-flow dependencies of the instructions in the basic block, it is possible that one or more instructions can be next in the basic block. One of the instructions that can be next (as identified in act 346) is then selected to be the next instruction (act 348). In situations where a pool of multiple instructions can be next, at least a portion of the digital signature is used to select which of the pool of instructions is to be the next instruction.

A check is then made as to whether there are any additional instructions in the basic block that have not yet been selected (act 350). If there are any instructions in the basic block that have not yet been selected, the process returns to act 346 to identify one or more of the instructions that have not yet been selected that can be next (act 346). However, if there are no additional instructions in the basic block that have not yet been selected, then the instructions in the basic block are ordered in accordance with their order of selection in acts 344 and 348 above (act 352).

Figures 9, 10:
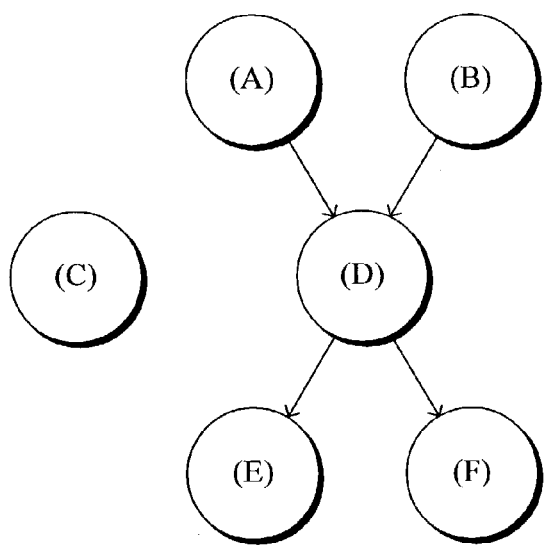
FIG. 9 illustrates a table with six instructions, their initial ordering, and their possible positions within a basic block.
FIG. 10 illustrates the data-flow dependencies of the instructions of FIG. 9 in a dependency graph format.

Following is an example of instruction reordering of a basic block. Six instructions are used in the following example, although it is to be appreciated that fewer or greater instructions may exist in a basic block. FIG. 9 illustrates a table 370 with six instructions identified as (A), (B), (C), (D), (E), and (F), as well as their initial ordering and their possible positions within the basic block. In FIG. 9, "IP" refers to the initial position of the instruction in the basic block, "PP" refers to a possible position for the instruction in the basic block (depending on the data-flow dependencies of the basic block), "CP" refers to a conditional position for the instruction in the basic block (depending on the data-flow dependencies of the basic block as well as the position that other instructions have been reordered to), and "NP" refers to a position that is not possible for the instruction in the basic block (given the data-flow dependencies of the basic block). A control step k can be conditionally occupied by instruction (m) if there exists at least one more instruction whose scheduling in control step j enables scheduling of instruction (m) in control step k such that no data-flow dependency between instructions is violated.

Thus, from FIG. 9, it can be seen that the initial order of the instructions, as they exist in the software master-copy, is as follows:

| | | |
|---|---|---|
| 0x0080e0 | LDR | r1,[r8,#0] |
| 0x0080e4 | LDR | r0,[r9,#0] |
| 0x0080e8 | MOV | r3,r5 |
| 0x0080ec | MUL | r2,r0,r1 |
| 0x0080f0 | MOV | r1,#1 |
| 0x0080f4 | LDR | r0,[r6,#0] |

The possible positions for instructions are dependent on the data-flow dependencies of the instructions in the basic block. For example, in the initial ordering of instructions, instruction (A) is first, instruction (B) is second, and instruction (D) is fourth. Instruction (A) is an LDR (Load Register) instruction that loads a value into register r1 and instruction (B) is an LDR instruction that loads a value into register r0.

Thus, from a data-flow dependency perspective, instructions (A) and (B) could be reordered so that instruction (B) is first and instruction (A) is second without changing the functionality of the block of code. However, instruction (D) is a multiply (MUL) instruction that is based on the value in register r1. Therefore, the instructions could not be reordered to put instruction (D) before instruction (A) because instruction (D) relies on the value of a register that may be changed in instruction (A).

FIG. 10 illustrates the data-flow dependencies of the instructions in a dependency graph format. As illustrated in dependency graph 380 of FIG. 10, instruction (D) must be ordered before instructions (E) and (F), but instructions (E) and (F) can be ordered in any order with respect to each other (i.e., instruction (E) could be before or after instruction (F), but both must be after instruction (D)). Instructions (A) and (B) both have to be ordered before instruction (D), but can be ordered in any order with respect to each other (i.e., instruction (A) could be before or after instruction (B), but both must be before instruction (D)). Instruction (C) can be ordered anywhere.

Assume that a portion of the digital signature to be embedded in the block of six instructions is the bit string "0110". This bit string "0110" can be embedded in the block of six instructions by reordering the instructions as follows. Since there are six instructions, there are six different "slots" or potential locations for instructions. When embedding the bit string, each slot is considered in order and a determination is made as to which instructions could be located in that slot. If there is only one instruction that can be located in that slot, then that one instruction is selected for that slot and none of the bits from the bit string are embedded in the selection of that instruction. However, if there are multiple instructions that can be selected for that slot, then one of those multiple instructions is selected for that slot as identified by bits from the bit string.

Referring now to FIGS. 11A-11E, the selection of the instructions for each of the six positions in the block is illustrated. The asterisked instructions in FIGS. 11A-11E refer to instructions that although available cannot be taken because of data-flow dependencies of instructions in the block. In FIG. 11A, a table 400 is illustrated including encodings 402. As indicated in control step 1 of table 400, any of instructions (A), (B), or (C) can be placed in the first position of the block (e.g., as can be seen in FIGS. 9 and 10). These three instructions are aligned with the encodings 402 according to some policy, such as in the order the instructions appear in the software master-copy.

As there are three different instructions that could be placed in the first position of the block, one of those three is selected based on the bit string "0110" indicated above. As there are three different instructions, two of the bits from the bit string are used. In this example, the least significant bits of the bit string are being used, so the bits "10" are selected. The bits "10", using encodings 402, indicate instruction (C), so instruction (C) is selected for the first position in the reordered instructions.

The number of instructions that could be placed in a particular control step may not always correspond to the encodings on a one-to-one basis. For example, as illustrated in FIG. 11A, there is no mapping for encoding "11". These situations can be resolved in any of a variety of manners, so long as both the installer and the verifier resolve them in the same manner. In one implementation, the control step makes use of only as many bits as it can while maintaining a one-to-one mapping of encodings to instructions, but realizing that not all instructions will be mapped to an encoding. For example, in FIG.

11A, only one bit could be used, mapping encoding "0" to instruction (A) and encoding "1" to instruction (B), and not mapping instruction (C) to any encoding. In an alternate implementation, multiple encodings may be mapped to the same instruction. For example, in FIG. 11A, one of the instructions (A), (B), or (C) could be also mapped to encoding "11", resulting in a multiple-to-one mapping of encodings to instructions. Which of instructions (A), (B), or (C) is also mapped to encoding "11" can be determined in accordance with any of a variety of policies (e.g., repeat the last instruction (instruction (C)), the first instruction (instruction (A)), repeat the order of instructions (use instruction (A) first, then instruction (B), then instruction (C), then instruction (A), etc.), and so forth). In another alternate implementation, the unused encoding(s) (e.g., encoding "11" in FIG. 11A) can be saved and used in the next control step.

In FIG. 11B, a table 406 is illustrated. As indicated in control step 2 of table 406, instruction (A) or (B) can be placed in the second position of the block (e.g., as can be seen in FIGS. 9 and 10). In this example, instruction (C) can no longer be placed in the second position of the block as instruction (C) has already been selected for placement in the first position. These two instructions (A) and (B) are aligned with encodings 402 according to some policy, such as in the order the instructions appear in the software master-copy.

As there are two different instructions that could be placed in the second position of the block, one of those two is selected based on the bit string "0110" indicated above. The next least significant bit in the string (after the two bits used above to select instruction (C)) is used, which is "1". The bit "1", using encodings 402, indicates instruction (B), so instruction (B) is selected for the second position in the reordered instructions.

In FIG. 11C, a table 412 is illustrated. As indicated in control step 3 of table 412, instruction (A) or (D) can be placed in the third position of the block (e.g., as can be seen in FIGS. 9 and 10). In this example, instructions (C) and (B) can no longer be placed in the third position of the block as instructions (C) and (B) have already been selected for placement in the first and second positions. These two instructions are aligned with encodings 402 according to some policy, such as in the order the instructions appear in the software master-copy.

Although instruction (D) could conditionally be placed in the third position (as illustrated in FIG. 9), instruction (D) cannot be positioned before instruction (A) as illustrated in FIG. 10. Thus, since instruction (A) has not been positioned yet, instruction (D) can no longer be placed in the third position of the block. So, there is only one instruction that can be placed in the third position (instruction (A)), and no bits of the bit stream are used to select instruction (A).

In FIG. 11D, a table 418 is illustrated. As indicated in control step 4 of table 418, instruction (D), (E), or (F) can be placed in the fourth position of the block (e.g., as can be seen in FIGS. 9 and 10). In this example, instruction (C) can no longer be placed in the fourth position of the block as instruction (C) has already been selected for placement in the first position. These three instructions are aligned with encodings 402 according to some policy, such as in the order the instructions appear in the software master-copy.

Although instructions (E) and (F) could conditionally be placed in the fourth position (as illustrated in FIG. 9), instructions (E) and (F) cannot be positioned before instruction (D) as illustrated in FIG. 10. Thus, since instruction (D) has not been positioned yet, instructions (E) and (F) can no longer be placed in the fourth position of the block. So, there is only one instruction that can be placed in the fourth position (instruction (D)), and no bits of the bit stream are used to select instruction (D).

In FIG. 11E, a table 424 is illustrated. As indicated in control step 5 of table 424, instruction (E) or (F) can be placed in the fifth position of the block (e.g., as can be seen in FIGS. 9 and 10). In this example, instruction (C) can no longer be placed in the fifth position of the block as instruction (C) has already been selected for placement in the first position. These two instructions (E) and (F) are aligned with encodings 402 according to some policy, such as in the order the instructions appear in the software master-copy.

As there are two different instructions that could be placed in the fifth 11 position of the block, one of those two is selected based on the bit string "0110" indicated above. The next least significant bit in the string (after the two bits used above to select instruction (C) and the one bit used to select instruction (B)) is used, which is "0". The bit "0", using encodings 402, indicates instruction (E), so instruction (E) is selected for the fifth position in the reordered instructions.

After selection of instruction (E) for the fifth position in the reordered instructions, there is only one instruction remaining to be placed (instruction (F)). Instruction (F) is placed in the last position (the sixth position), and no bits of the bit stream are used to select instruction (F). Thus, it can be seen that the final order of the instructions, as they are 2 reordered to embed the bit string "0110", is as follows:

| | | |
|---|---|---|
| 0x0080e0 | MOV | r3,r5 |
| 0x0080e4 | LDR | r0,[r9,#0] |
| 0x0080e8 | LDR | r1,[r8,#0] |
| 0x0080ec | MUL | r2,r0,r1 |
| 0x0080f0 | MOV | r1,#1 |
| 0x0080f4 | LDR | r0,[r6,#0] |

In this example, the bits of the bit string are selected starting with the least significant bit and progress bit by bit to the most significant bit. Alternatively, bits could be used in other orders, so long as the order in which the bits are used is known to the verifier so that the embedded bits can be extracted as discussed in more detail below. Examples of such other orders include starting with the most significant bit and progressing towards the least significant bit, selecting bits in even locations of the bit stream before odd locations (e.g., bits in locations 0, 2, 4, 6, etc. before bits in locations 1, 3, 5, 7, etc.), selecting bits according to some other algorithm, and so forth.

Also in this example, the instructions are aligned with the encodings 402 in the order the instructions appear in the software master-copy. Alternatively, other policies can be used, such as according to their domain ordering, according to alphabetical order, according to registers used, and so forth. Virtually any policy can be used, so long as the policy is known to the verifier so that the embedded bits can be extracted as discussed in more detail below. Additionally, although the policies used to align instructions with the encodings 402 for different control steps are typically the same, alternatively different policies could be used, so long as the policies are known to the verifier so that the embedded bits can be extracted as discussed in more detail below.

Thus, it can be seen from this example, that the values in a string of bits can be embedded in a block of instructions by reordering those instructions. The functionality of the block of instructions when reordered is the same as the functionality of the block before reordering, so no change in the functionality of the software occurs. By repeating this reordering process for multiple basic blocks in an atomic execution unit, additional bits from the digital signature can also be encoded in the atomic execution unit.

Figure 12:
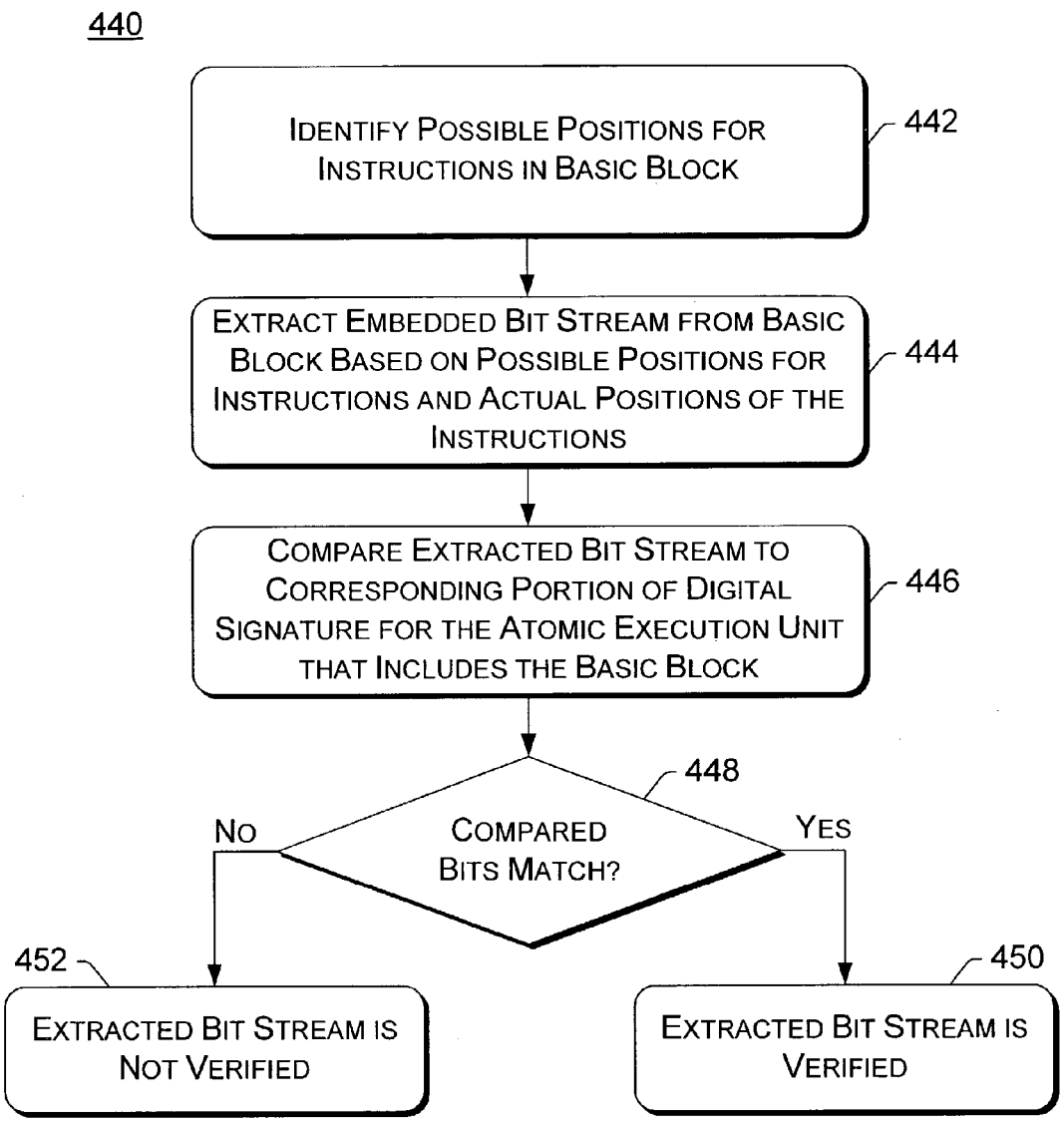
FIG. 12 is a flowchart illustrating an exemplary process for verifying a bit stream embedded in a basic block using instruction reordering.

A similar process is used by constraint verification module 244 of FIG. 5 to extract the bit stream embedded in a basic block by instruction reordering. FIG. 12 is a flowchart illustrating an exemplary process 440 for verifying a bit stream embedded in a basic block using instruction reordering. In one implementation, process 440 is performed by verifier 240 of FIG. 5, and may be implemented in hardware, software, firmware or combinations thereof.

Initially, the possible positions for instructions in the basic block are identified (act 442). These possible positions are identified in the same manner as discussed above for embedding the digital signature. For example, the possible positions of the six instructions (A)-(F) in the example above can be identified as discussed above with reference to FIGS. 9 and 10.

Given the possible positions for instructions in the basic block, an embedded bit stream is extracted from the basic block based on these possible positions as well as the actual positions of the instructions in the basic block (act 444). This extraction is performed analogously to the embedding of the bits into the basic block, except that rather than using the bits of the digital signature to determine which order the instructions are to be placed in, the actual order of the instructions (compared to the possible orders) is used to determine bits of the digital signature. For example, using the six instructions (A)-(F) in the example above, constraint verification module 244 can determine from the reordered instructions that instructions (A), (B), or (C) could be in the first position. Since instruction (C) is in the first position, constraint verification module 244 can determine that two bits of the digital signature are "10" as indicated in FIG. 11A.

Once the bit stream is extracted from the basic block, the extracted bit stream is compared to the corresponding portion of the digital signature for the atomic execution unit that includes the basic block (act 446). Process 440 then proceeds based on whether the compared bits match (act 448). If the compared bits match then the extracted bit stream is verified (act 450). Whether the entire digital signature is verified is dependent on whether the remaining bits of the digital signature embedded elsewhere and/or using other constraint types in the atomic execution unit are verified. However, if the compared bits do not match then the extracted bit stream is not verified (act 452), and the digital signature is not verified regardless of whether bits of the digital signature embedded elsewhere and/or using other constraint types in the atomic execution unit are verified.

Alternatively, rather than comparing the extracted bits to the digital signature as the bits are extracted, the extracted bits may be added to an "extracted" digital signature. Once all of the bits for the embedded digital signature are extracted and added to the extracted digital signature, the entire extracted digital signature is compared to the generated digital signature as discussed above with reference to FIG. 6.

The degree of freedom for the instruction reordering constraint type for an atomic execution unit I is computed as follows:

$$\delta(I, C_1) = \prod_{\forall block \in I} \delta(block, C_1)$$

where $C_1$ represents the instruction reordering constraint type and block represents each basic block in the atomic execution unit. The degree of freedom of a particular basic block is determined by analyzing the block and determining how many different instruction orders exist for the block that satisfy the data-flow dependencies for that block. For example, all possible permutations of instruction orders for the block may be analyzed, those permutations that satisfy the data-flow dependencies for the block identified, and the number of those permutations that satisfy the data-flow dependencies for the block is the degree of freedom for the block. In some situations, in order to reduce the complexity of calculating the degree of freedom, when calculating the degree of freedom the number of instructions in a basic block may be limited to a particular number (e.g., limited to ten instructions, although other limits may alternatively be used). If a basic block in the atomic execution unit has more instructions than this limit, then the basic block is separated into two or more blocks of no more than the limit (e.g., if a basic block has twenty instructions, it would be separated into two basic blocks of ten instructions each). It should be noted, however, that this separating is only for the purpose of calculating the degree of freedom—the basic blocks are not subject to this limit when the instruction reordering discussed above is performed.

Basic Block Reordering

The basic block reordering constraint type is similar to the instruction reordering constraint type discussed above, except that entire basic blocks within the atomic execution unit are reordered rather than individual instructions within the basic blocks. The basic blocks are reordered in a manner that embeds one or more bits of the digital signature in the atomic execution unit. Additionally, although the basic blocks are reordered, the program functionality is not altered.

During code verification, basic block boundaries are not known inside of an atomic execution unit unless the basic block is ended with a control transfer instruction such as a conditional branch. Thus, in one implementation the software master-copy is to be written so that if a basic block does not end with a control transfer instruction, an unconditional branch to the following instruction is inserted at the end of the block. This way, verifier 240 of FIG. 5 is able to determine the basic block boundaries in order to extract the encoded constraints. Alternatively, other solutions to this situation may be used, such as to use, when embedding bits of the digital signature using the basic block reordering constraint type, only basic blocks which do end with a control transfer instruction. This alternative may reduce the number of basic blocks within the atomic execution unit that can be used, but does not involve adding any instructions to the software master-copy.

Additionally, situations can arise where basic blocks span across two or more atomic execution units. In such situations, the basic blocks are partitioned along atomic execution unit borders and treated as separate basic blocks.

For the basic block reordering constraint type, basic blocks of an atomic execution unit can be domain ordered in a variety of different manners. In one implementation, the basic blocks are domain ordered using the first data-flow instruction in each basic block. These first instructions are sorted in the same manner as discussed above with reference to domain ordering of the instruction reordering constraint type. The basic blocks are then sorted to be in the same order as indicated for their corresponding first instructions. The individual instructions within a basic block are not reordered when domain ordering for the basic block reordering constraint type. It should be noted that, in situations where both the instruction reordering and the basic block reordering constraint types are used, the domain ordering-performed for the instruction reordering constraint type can be reused for the basic block reordering constraint type rather than requiring the domain to be ordered again.

By way of example, assume there are three basic blocks in an atomic execution unit. To domain order the three basic blocks, the first instruction from each of the three blocks is obtained and those three first instructions are domain ordered as discussed above with reference to domain ordering of the instruction reordering constraint type. Assume this domain ordering results in the first instruction of the second block being first, the first instruction from the third block being second, and the first instruction from the first block being third. Then, the three basic blocks would be domain ordered with the second block being first, the third block being second, and the first block being third.

When installing software, constraint embedding module 134 selects, based on at least a portion of the digital signature, one from the possible permutations of basic blocks of an atomic execution unit that preserve the functionality of the atomic execution unit. Constraint embedding module 134 then reschedules or reorders the basic blocks according to this selected basic block order. Constraint embedding module 134 builds the ordering by selecting a specific basic block from a pool of basic blocks that can be situated at a particular location in the atomic execution unit. Which basic blocks can be situated at a particular location in the atomic execution unit is determined based on the data-flow dependencies of the instructions in the basic blocks. The selection of particular basic blocks allows bits of the digital signature to be embedded in the atomic execution unit in a manner analogous to the embedding of bits using the instruction reordering constraint type as discussed above.

It should be noted that, when reordering basic blocks, certain branch instructions may need to be changed and/or added in order to preserve the execution paths through the atomic execution unit. Examples of such ordering are illustrated in FIGS. 13A and 13B.

Figure 13B:
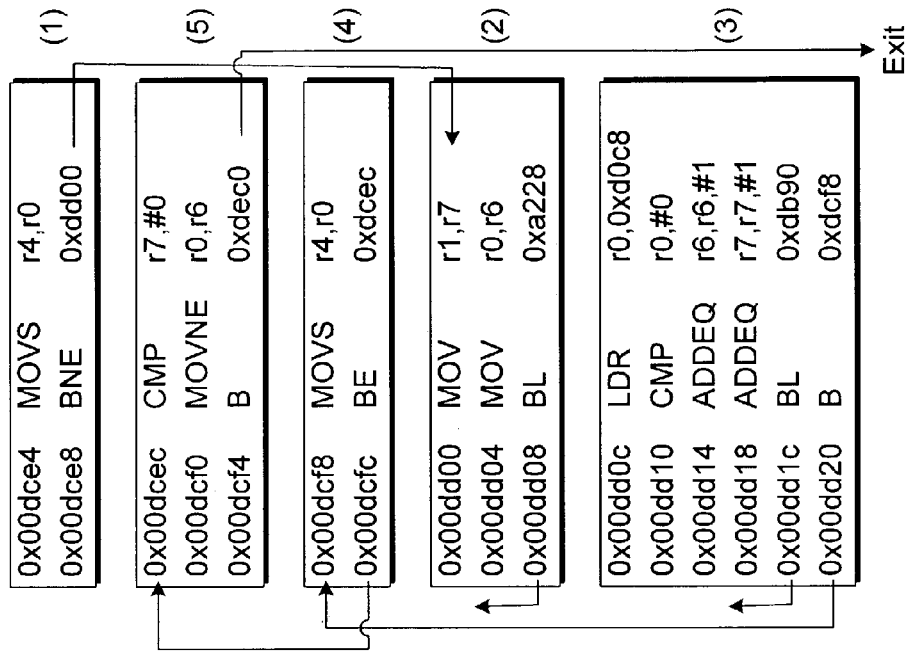
FIGS. 13A and 13B illustrate how basic block reordering can be performed using five basic blocks.
Figure 13A:
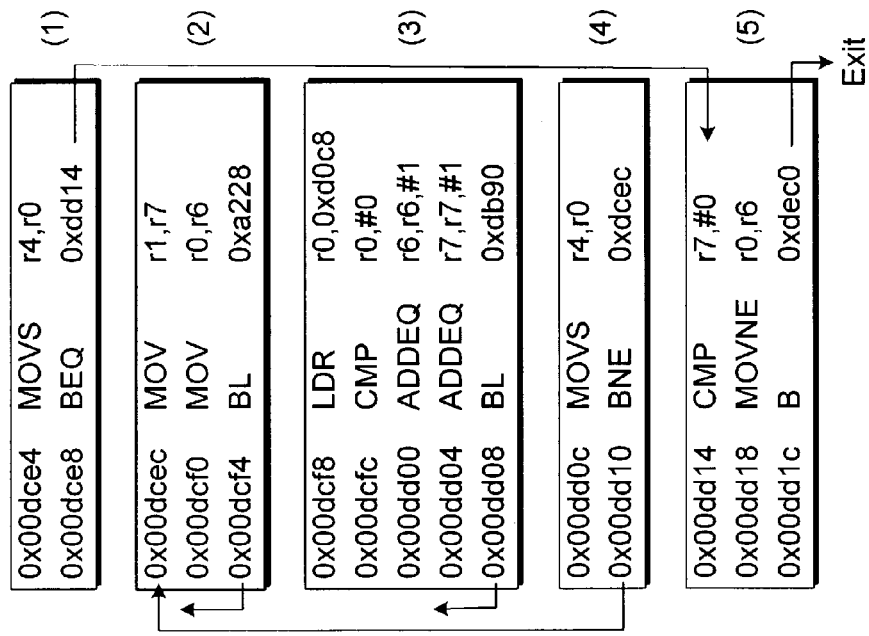

FIGS. 13A and 13B illustrate how basic block reordering can be performed using five basic blocks. Although five basic blocks are illustrated in FIGS. 13A and 13B, it is to be appreciated that a larger or smaller number of basic blocks may exist in any particular atomic execution unit. FIG. 13A illustrates the original ordering of the five basic blocks, and FIG. 13B illustrates one possible way in which the basic blocks can be reordered.

The arrows in FIGS. 13A and 13B represent a possible change of the execution order due to branching. All execution paths through the atomic execution unit should exist after the basic block reordering procedure in order to maintain the program functionality. Thus, in this example, some of the branches are redirected and their branching condition is changed. For example, in FIG. 13A the branch instruction on address 0x00dce8 (in basic block (1)) was to address 0xdd14 (in basic block (5))—if the branch condition is satisfied then execution flow jumps to address 0x00dd14, whereas if the condition is not satisfied then execution flow continues to address 0x00dcec (in block (2)). With the basic blocks reordered as illustrated in FIG. 13B, in order to maintain this execution flow, the branch instruction on address 0x00dce8 (in basic block (1)) is changed from a BEQ (Branch on Equal) to BNE (Branch on Not Equal) to address 0xdd00 (in basic block (2)). By changing the addresses being branched to, as well as the branching condition, the execution flow remains the same even though the basic blocks are reordered.

Additionally, in some situations, an unconditional branch is inserted into a basic block in order to preserve the execution flow of the atomic execution unit. For example, in order to maintain the execution flow, an unconditional branch instruction is added to basic block (3) at address 0x00dd20. This unconditional branch is to address 0xdcf8 (in block (4)), which preserves the execution flow as seen in FIG. 13A from basic block (3) to basic block (4).

It should be noted that even though branches may be redirected and their branching condition changed, and/or unconditional branches may be added, branching instructions are not data-flow instructions. Thus, when performing domain ordering and generating the digital signature for the atomic execution unit, the branch instructions are not used. Therefore, redirection of branches, changing of branch conditions, and/or unconditional branches do not alter the domain ordering or digital signature generation.

A similar process is used by constraint verification module 244 of FIG. 5 to extract the bit stream embedded in an atomic execution unit by basic block reordering. The basic blocks are domain ordered for verification in the same manner as when the bit stream was embedded in the atomic execution unit for basic block reordering. The bit stream can also be extracted from the atomic execution unit based on the actual ordering of the basic blocks and the possible orderings of the basic blocks, analogous to the discussion above regarding extracting the bit stream using the instruction reordering constraint type.

The degree of freedom for the basic block reordering constraint type for an atomic execution unit I is computed as follows:

$$\delta(I, C_2) = N!$$

where $C_2$ represents the basic block reordering constraint type and N represents the number of basic blocks in the atomic execution unit.

Permutation of Register Assignment

For the permutation of register assignment constraint type, register assignments within the atomic execution unit are changed in a manner that embeds one or more bits of the digital signature in the atomic execution unit. Although the register assignments are changed, the program functionality is not altered.

It should be noted that the permutation of register assignment constraint type is performed after instruction reordering constraints (if being used) are embedded, because the domain ordering for permutated register assignment depends on the result of the instruction reordering transformation.

As used in the permutation of register assignment constraint type, the set of registers modified within the atomic execution unit is referred to as the working register set (WVRS). The working register set is typically a subset of the full register file. Additionally, the working register set serves as the domain for the permutation of register assignment constraint type.

The domain ordering for the permutation of register assignment constraint type is performed by assigning a unique identifier $X(z)$ to a variable z that is equal to the difference a−b where a is the address of the instruction that creates z and b is the starting address of the atomic execution unit. The registers used in the instructions of the atomic execution unit are assigned according to the order of the unique identifiers assigned to the variables.

For example, assume the following code segment of four instructions is to be domain ordered:

```
0x0080e0        LDR         r12,[r2],#2
0x0080e4        LDR         r3,[r1,#0]
0x0080e8        MOV         r4,r5
0x0080ec        MUL         r2,r0,r12
```

Assuming that the first of these four instructions is the first instruction in the atomic execution unit, the unique identifier for the variable originally stored in r12 is zero, and the unique identifier for the variable originally stored in r3 is four. There are two distinct register assignments in this code segment, and the affected registers are r12 and r3. These registers are placed in the working register set in numerical order, so the working register set is the set {r3, r12}. For domain ordering, the first variable assigned in this code segment (that is, the variable having the smallest unique identifier) is assigned to the first register in the working register set, which is r3. Subsequently assigned variables in the code segment are assigned to subsequent registers of the working register set according to the order of the unique identifiers and the register indexes in the working register set. Thus, for domain ordering purposes, the code segment in this example would be written as follows:

```
0x0080e0        LDR         r3,[r2],#2
0x0080e4        LDR         r12,[r1,#0]
0x0080e8        MOV         r4,r5
0x0080ec        MUL         r2,r0,r3
```

For the permutation of register assignment constraint type, constraint embedding is performed by assigning the variables generated within the atomic execution unit to a permutation of the working register set. The new assignment is determined by at least a portion of the digital signature, by the dependencies among variables, and by the set of available registers of the working register set at particular control steps. It should be noted that the register reassignment within one atomic execution unit is propagated throughout all atomic execution units in which the modified variables are alive. This propagation can be performed by following the instruction execution flow from the atomic execution unit to any other atomic execution unit (e.g., any other atomic execution unit that can be executed from this atomic execution unit, which may result in going through multiple atomic execution units) and changing the assignment for each reassigned register until a new variable is assigned to that register (and the variable is thus no longer alive). It should also be noted that this propagation need not be done during verification.

Figure 14:
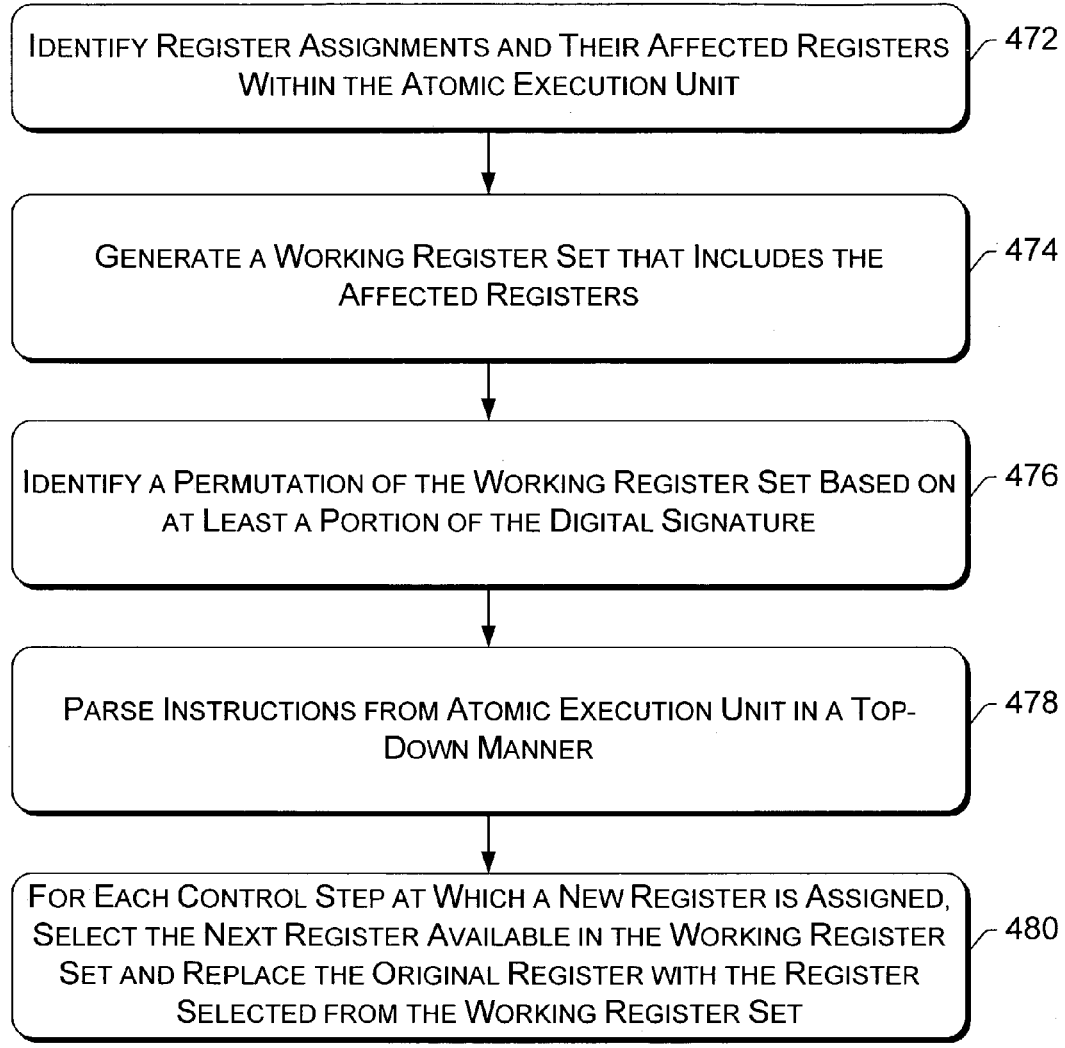
FIG. 14 is a flowchart illustrating an exemplary process for embedding a portion of a digital signature in an atomic execution unit using the permutation of register assignment constraint type.

FIG. 14 is a flowchart illustrating an exemplary process 470 for embedding a portion of a digital signature in an atomic execution unit using the permutation of register assignment constraint type. In one implementation, process 470 is performed by installer 130 of FIG. 2, and may be implemented in hardware, software, firmware or combinations thereof.

Initially, register assignments and their affected registers within the atomic execution unit are identified (act 472). A working register set is then generated that includes the affected registers (act 474). A permutation of the working register set is identified based on at least a portion of the digital signature (act 476), and the instructions in the atomic execution unit are parsed in a top-down manner (act 478). Then, for each control step in the atomic execution unit at which a new register is assigned, the next register available in the working register set is selected and is used to replace the original register at that control step (act 480). The replacement of the original register with the selected register from the working register set is repeated for all subsequent appearances of the original register in the atomic execution unit.

FIGS. 15A, 15B, and 15C illustrate an example of the permutation of register assignment constraint type. FIGS. 15A, 15B, and 15C are discussed with reference to a code segment that contains 16 instructions. It should be noted that the permutation of register assignment constraint type can be used with other numbers of instructions, including greater or fewer than 16 instructions.

The original register assignment of this code segment is shown in FIG. 15A. The numbers on the left-hand side of each of FIGS. 15A, 15B, and 15C refer to the control steps (one control step for each of the 16 instructions). There are six distinct register assignments in the code segment, and the affected registers are r2, r3, r6, r7, r12, and r14. Thus, the working register set is the set {r2, r3, r6, r7, r12, r14}. In this example, constraint embedding module 134 of FIG. 2 uses bits from the digital signature to select one of the possible permutations of the working register set. As there are six different registers in the working register set, the maximum number of permutations of the working register set is 6! (6×5×4×3×2×1=720). The actual number of permutations of the working register set may be less than 720, however, due to the potential lack of availability of certain registers for (re)assignment at different times, as discussed in more detail below. Analogous to the discussion above regarding the instruction reordering constraint type, the permutations of the working register set can be associated with particular encodings of bits of the digital signature in accordance with any of a wide variety of policies (so long as that association is known to the verifier as well).

Assume in this example that the nine bits of the digital signature identify the following permutation of the working register set: {r6, r7, r3, r2, r12, r14}. FIG. 15B shows the registers of the working register set that are available for (re)assignment at each control step in which a variable is assigned (that is, control steps 1, 2, 5, 11, 13, and 14). For example, in the first control step, the registers of the working register set that are available for (re)assignment are {r3, r6, r7, r12}. Registers r2 and r14 are not available for (re)assignment because they are used as sources in instructions prior to their assignment in the code segment.

Constraint embedding module 134 of FIG. 2 parses the atomic execution unit top-down and at each control step at which a new register is assigned to a variable, module 134 selects a register from the registers of the working register set that are available for (re)assignment with the smallest index in the set (e.g., the first register in the set). For example, register r6 is assigned to the variable created by the first instruction in the atomic execution unit. The used register replaces all appearances of the replaced variable. Namely, r6 replaces all occurrences of r3 in the code segment. Register r6 is then removed from the working register set. Registers that are used as source registers prior to their assignment are added to the working register set as they become available. For example, register r2 is added to the working register set in control step 5. The resulting register assignment is illustrated in FIG. 15C.

A similar process is used by constraint verification module 244 of FIG. 5 to extract the bit stream embedded in an atomic execution unit by the permutation of register assignment. The domain ordering for verification is performed in the same manner as when the bit stream was embedded in the atomic execution unit for the permutation of register assignment constraint type. The bit stream embedded in the atomic execution unit using the permutation of register assignment constraint type can be extracted from the atomic execution unit by identifying the register assignments and affected registers (as in act 472 above). As the variables are sorted in the order they are generated, and the registers inherit their indices in the working register set, the permutation of the working register set used to embed the bit stream can be readily identified by analyzing the code segment. For example, when verifying the code segment of FIG. 15C, constraint verification module 244 can readily determine at control step 1 that since register r6 was the first register selected from the working register set, r6 is the first register in the working register set.

Once the permutation of the working register set is identified by constraint verification module 244, the encoding associated with that permutation and thus the embedded bit stream can be readily identified.

It should be noted that various modifications can be made to the permutation of register assignment constraint type than those discussed with reference to the example of FIGS. 15A, 15B, and 15C above. For example, rather than selecting the next register available in the working register set, some other ordering other than the register indices can be used (e.g., in reverse order of their indices, registers that are even numbers or prime numbers selected first, or in accordance with some other formula or selection criteria).

The degree of freedom for the permutation of register assignment constraint type for an atomic execution unit I is computed as follows:

$$\delta(I, C_3) = \prod_{i=1}^{N} |WRS(i)| \leq N!$$

where $C_3$ represents the permutation of register assignment constraint type, N represents the number of modified registers within the atomic execution unit, and $|WRS(i)|$ is the cardinality of the available subset of registers from the working register set at control step i. Thus, as can be seen from FIG. 15B, the total number of all possible register reassignments in the example FIGS. 15A, 15B, and 15C is 4×3×3×3×2×1=216.

Conditional Branch Selection

For the conditional branch selection constraint type, conditional branches within the atomic execution unit are changed in a manner that embeds one or more bits of the digital signature in the atomic execution unit. Although the conditional branches are changed, the program functionality is not altered.

For the conditional branch selection constraint type, the atomic execution unit can be domain ordered in the same manner as discussed above with reference to the instruction reordering constraint type. Alternatively, since the conditional branch selection constraint type only changes branch instructions, the ordering and content of the data-flow (non-branch) instructions in the atomic execution unit are not changed by the conditional branch selection constraint type, so the domain ordering of the instructions in the atomic execution unit can simply be their order of appearance in the atomic execution unit (that is, no additional sorting is necessary).

FIG. 16 is a flowchart illustrating an exemplary process 500 for embedding a portion of a digital signature in an atomic execution unit using the conditional branch selection constraint type. In one implementation, process 500 is performed by installer 130 of FIG. 2, and may be implemented in hardware, software, firmware or combinations thereof.

Initially, the conditional branch instructions in the atomic execution unit are identified (act 502). For each conditional branch instruction, a bit of the digital signature is used to determine whether to change the instruction (act 504). The bit can be used in different manners to determine whether to change the instruction, such as by associating particular encodings with particular conditional branch instructions. For example, if the branch instruction is either a "greater-than" condition or a "less-than-or-equal-to" condition, a bit value of zero indicates to use the "greater-than" condition whereas a bit value of one indicates to use the "less-than-or-equal-to" condition. By way of another example, if the branch instruction is either an "equal" condition or "not equal" condition, a bit value of zero indicates to use the "not equal" condition whereas a bit value of one indicates to use the "equal" condition.

For each conditional branch instruction that is to be changed, the branches are redirected as necessary to maintain execution flow (act 506). The manner in which the branches are redirected can vary based on the particular branch conditions. The redirection of branches can be seen from the following example. Assume that a set of instructions from the software master-copy is as follows:

| | | |
|---|---|---|
| 0x00a0e0 | MOV | r2,r5 |
| 0x00a0e4 | BNE | 0xa0ec |
| 0x00a0e8 | MOV | r2,r6 |
| 0x00a0ec | CMP | r2,#0 |

Further assume that a bit of the digital signature indicates that the BNE (Branch on Not Equal) conditional branch instruction should be changed. The BNE conditional branch instruction is changed by selecting the opposite conditional branch instruction BEQ (Branch on Equal). In order to maintain the execution flow, the BEQ instruction is a branch to a different address, and an additional unconditional branch B instruction is added to the code as follows:

| | | |
|---|---|---|
| 0x00a0e0 | MOV | r2,r5 |
| 0x00a0e4 | BEQ | 0xa0ec |
| 0x00a0e8 | B | 0xa0f0 |
| 0x00a0ec | MOV | r2,r6 |
| 0x00a0f0 | CMP | r2,#0 |

A similar process is used by constraint verification module 244 of FIG. 5 to extract the bit stream embedded in an atomic execution unit by the conditional branch selection constraint type. The domain ordering for verification is performed in the same manner as when the bit stream was embedded in the atomic execution unit for the conditional branch selection constraint type. The bit stream embedded in the atomic execution unit using the permutation of register assignment constraint type can be extracted from the atomic execution unit by identifying the conditional branch instructions in the atomic execution unit (as in act 502 above). For each conditional branch instruction, constraint verification module 244 can readily determine the value of the bit embedded in that branch instruction by using the same encodings as were used by installer 130 when installing the software. It should be noted that no changes to the code need to be made by constraint verification module 244, as constraint verification module 244 is extracting the bit stream embedded in the atomic execution unit.

The degree of freedom for the conditional branch selection constraint type for an atomic execution unit I is computed as follows:

$$\delta(I, C_4) = 2^N$$

where $C_4$ represents the conditional branch selection constraint type and N represents the number of conditional branch instructions in the atomic execution unit.

Filling Unused Instruction Fields

For the filling unused instruction fields constraint type, unused instruction fields within the atomic execution unit are changed in a manner that embeds one or more bits of the digital signature in the atomic execution unit. Although the instruction fields are changed, the program functionality is not altered.

For the filling unused instruction fields constraint type, the atomic execution unit can be domain ordered in the same manner as discussed above with reference to the instruction reordering constraint type. Alternatively, since the filling unused instruction fields constraint type only changes instructions that are not data-flow instructions, the data-flow instructions in the atomic execution unit are not changed by the conditional branch selection constraint type, so the domain ordering of the instructions in the atomic execution unit can simply be their order of appearance in the atomic execution unit (that is, no additional sorting is necessary).

In one implementation, the filling unused instruction fields constraint type adds instructions with fields that ensure the instructions will not alter the functionality of the program when executed. A variety of such different instructions can be used, such as an instruction adding zero to a register, an instruction subtracting zero from a register, an instruction adding an arbitrary value to a register which does not contain a live variable, an instruction subtracting an arbitrary value from a register which does not contain a live variable, and so forth.

These instructions are added by installer 130 of FIG. 2 during the installation process. For example, a software interrupt instruction can be added with appropriate condition codes that ensure that the instruction never causes an interrupt. By selecting such condition codes appropriately, installer 130 can be reasonably certain that such an instruction with those condition codes would not otherwise appear in the software. Any unused portions of such an instruction can then be used to embed bits of the digital signature. The bits may be embedded by simply setting the bits in that portion to be the same as those of the portion of the digital signature being embedded. Alternatively, the portion of the digital signature may be processed in some other manner (e.g., encrypted) and the encrypted version of that portion embedded in that unused portion of the instruction.

The specific instruction(s) used for the filling unused instruction fields constraint type can vary based on the desires of the designer and/or manufacturer of the software, as well as on the type of processor, processor architecture, and/or processor instruction set of the computing device on which the software will be executed.

During verification, constraint verification module 244 of FIG. 5 knows the instruction(s) and condition codes that would be added by installer 130 for the filling unused instruction fields constraint type, as well as the manner in which bits of the digital signature are embedded in the instruction(s). Constraint verification module 244 can then identify any such instruction(s) in the atomic execution unit and readily extract the bits of the digital signature embedded in the instruction(s).

The degree of freedom for the filling unused instruction fields constraint type for an atomic execution unit I is computed as follows:

$$\delta(I, C_5) = 2^N$$

where $C_5$ represents the filling unused instruction fields constraint type and N represents the number of bits in the unused fields of the instructions added to the atomic execution unit.

Toggling the Signs of Immediate Operands

For the toggling the signs of immediate operands constraint type, immediate operands within the atomic execution unit are changed in a manner that embeds one or more bits of the digital signature in the atomic execution unit. Although the operands are changed, the program functionality is not altered.

For the toggling the signs of immediate operands constraint type, the atomic execution unit can be domain ordered by selecting all of the data-flow (nonbranch) instructions in the atomic execution unit except for those data-flow instructions that involve adding or subtracting an in-lined constant. These selected instructions can be sorted in the same manner as discussed above with reference to the instruction reordering constraint type, or alternatively the domain ordering of the selected instructions in the atomic execution unit can simply be their order of appearance in the atomic execution unit (that is, no additional sorting is necessary).

The toggling the signs of immediate operands constraint type relies on the basic notion that subtracting a particular value is functionally equivalent to adding the negative of that particular value, and vice versa. So, subtracting a value of one is functionally equivalent to adding a value of negative one. This basic notion is used for toggling the signs of immediate operands that are number constants.

During installation, installer 130 of FIG. 2 can use the bits from the digital signature in different manners to determine how to toggle the sign of an immediate operand of an addition or subtraction instruction. For example, particular encodings may be associated with particular signs, such as a value of zero being associated with a positive operand and a value of one being associated with a negative operand. By way of another example, particular encodings may be associated with particular instructions, such as a value of zero being associated with an addition instruction and a value of one being associated with a subtraction instruction.

Installer 130 identifies each addition or subtraction instruction with an immediate operand in the atomic execution unit and toggles the signs of the immediate operands of those instructions as appropriate based on a bit of the digital signature (a different bit being used for each instruction). Alternatively, rather than using every addition or subtraction instruction with an immediate operand in the atomic execution unit, a different criteria may be used for selecting particular ones of the instructions (e.g., every other instruction or every third instruction, only instructions with even immediate operands, only instructions with odd immediate operands, and so forth).

During verification, constraint verification module 244 of FIG. 5 knows the encodings used by installer 130 for the toggling the signs of immediate operands constraint type, as well as the criteria used to select instructions for toggling (e.g., every instruction, every other instruction, etc.). Constraint verification module 244 can then identify any such instruction(s) in the atomic execution unit and readily extract the bits of the digital signature embedded in the instruction(s).

The degree of freedom for the toggling the signs of immediate operands constraint type for an atomic execution unit I is computed as follows:

$$\delta(I, C_6) = 2^N$$

where $C_6$ represents the toggling the signs of immediate operands constraint type and N represents the number of addition and subtraction instructions with immediate operands in the atomic execution unit.

Returning now to discussing the constraint types in general, different ones of various constraint types can be combined in order to embed all of the bits of the digital signature into the atomic execution units. Which of these constraint types is used, and the order in which they are used, can vary by manufacturer and/or designer. By way of example, a manufacturer may choose to use the instruction reordering constraint type to embed 32 bits of a 64-bit digital signature, the basic block reordering constraint type to embed 20 bits of the 64-bit digital signature, and permutation of the register assignment constraint type to embed 12 bits of the 64-bit digital signature. By way of another example, another manufacturer may choose to use the instruction reordering constraint type to embed 28 bits of a 64-bit digital signature, the permutation of the register assignment constraint type to embed 22 bits of the 64-bit digital signature, and the conditional branch selection constraint type to embed 14 bits of the 64-bit digital signature. As long as the various conditions discussed herein are adhered to, and so long as the verification procedure knows the constraint types used by the installation procedure, a manufacturer and/or designer can select virtually any combination of the various constraint types.

In certain embodiments, as an added security precaution, installer 130 of FIG. 2 and/or verifier 240 of FIG. 5 impose an entropy threshold that is to be satisfied by each atomic execution unit. By imposing such a threshold, an adversary's task in breaking the system and generating a malicious atomic execution unit that would be successfully verified and executed is made more difficult. In certain embodiments, the entropy threshold refers to the sum of successfully enumerated elements in each of the domains of the constraint types used to embed the digital signature in the atomic execution unit. In one embodiment, the entropy threshold is at least 100, although other values could alternatively be used. When the entropy threshold is imposed by verifier 240, verifier 240 will check the entropy of each atomic execution unit as part of its verification of the atomic execution unit. If the atomic execution unit does not satisfy the entropy threshold, then verifier 240 will indicate that the atomic execution unit is not verified (e.g., as in act 274 of FIG. 6).

When the entropy threshold is imposed by installer 130, installer 130 will check the entropy of each atomic execution unit before installing that atomic execution unit on the computing device. If the atomic execution unit does not satisfy the entropy threshold, then installer 130 can take one or more of various actions. For example, installer 130 may refuse to create the corresponding software working-copy, installer 130 may perturb the executable so that the constraint for minimal entropy is satisfied for all atomic execution units (e.g., installer 130 may permute the basic blocks in atomic execution units so that all of the atomic execution units under the new permutation have a sufficient degree of freedom), installer 130 may improve the entropy of the atomic execution unit by adding dead-code which generally results in a minor increase in code size and slight decrease in performance, and so forth.

It should be noted that multiple examples are included herein using specific instructions from the ARM instruction set. These examples, however, are merely examples of using the constraint embedding as described herein. Constraints can also be imposed using any of a wide variety of other instruction sets.

Figure 17:
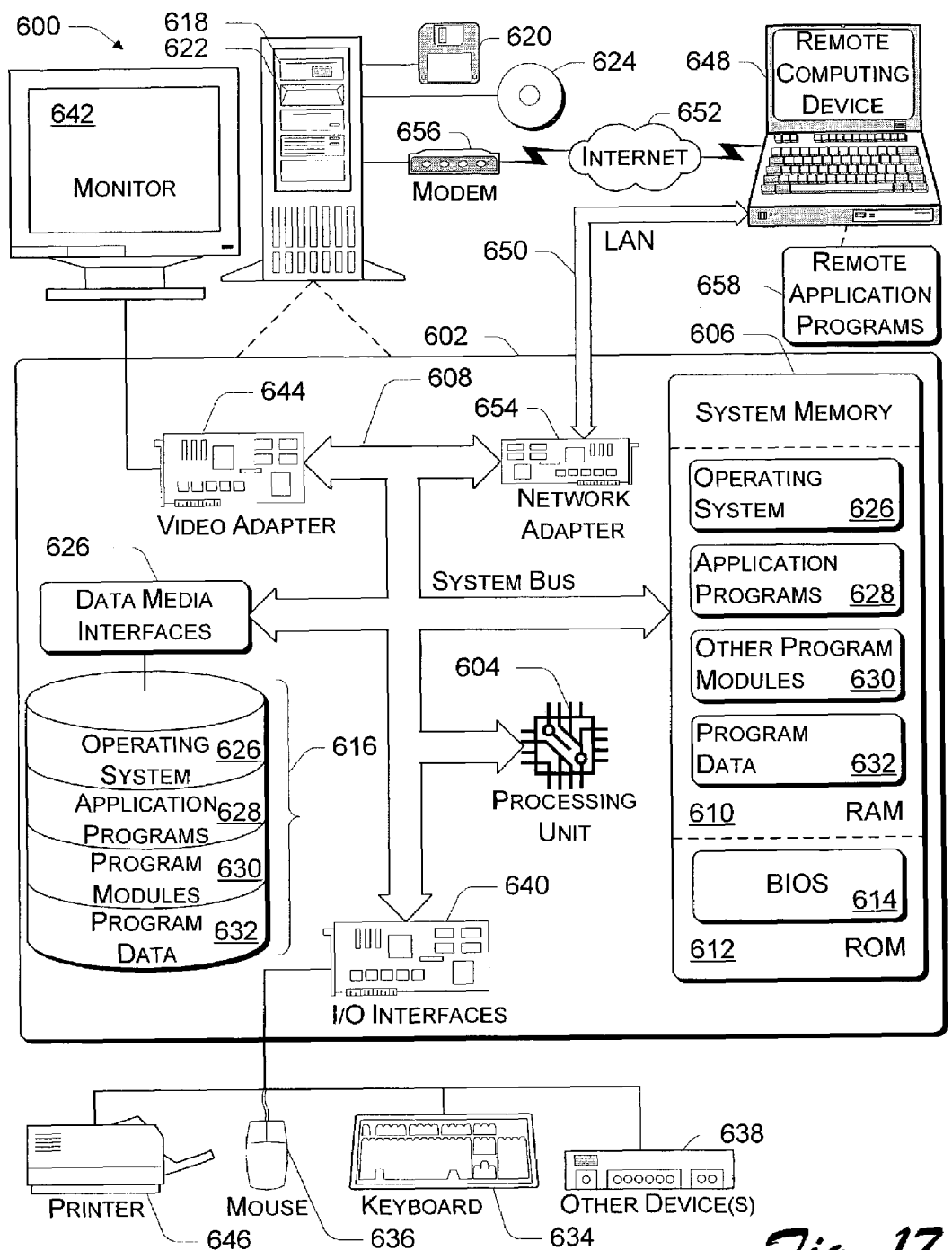
FIG. 17 illustrates a general computer environment, which can be used to implement the techniques described herein.

FIG. 17 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a computing device including installer 130 of FIG. 2, and verifier 240 of FIG. 5. The components of computer 602 can include, but are not limited to, one or more processors or processing units 604 (optionally including one or more security processors or coprocessors and/or one or more cryptographic processors or coprocessors), a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information 19 between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 17 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, 25 and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, implemented in a computing device, of installing software on the computing device, the method comprising:

modifying one or more instructions of the software to embed a digital signature in the software;

checking an entropy of each of a plurality of atomic execution units of the software; and storing the software on the computing device only if an entropy threshold is satisfied by each of the atomic execution units, wherein the storing comprising storing the software on the computing device so that the software can be executed on the computing device in a trusted mode if the signature is verified, and so that the software can be executed on the computing device without additional modification in a public mode where the signature is not verified;

wherein the modifying comprises:

selecting an atomic execution unit of the software, wherein the atomic execution unit comprises a plurality of instructions of the software;

generating, based on a key of the computing device, the digital signature for the atomic execution unit;

adding the digital signature to the atomic execution unit; and adding, as an instruction in the atomic execution unit immediately preceding the digital signature, a jump instruction so that when the atomic execution unit is executed the digital signature is not executed.

2. A method as recited in claim 1, wherein the modifying comprises modifying instructions in each of a plurality of atomic execution units to embed a digital signature in each of the atomic execution units.

3. A method as recited in claim 2, wherein an amount of instructions in an atomic execution unit is equal to an amount of instructions in a cache line of a processor of the computing device.

4. A method as recited in claim 1, further comprising not revealing a key used to generate the digital signature outside of an installer module that performs the modifying and storing.

5. A method as recited in claim 1, wherein the modifying comprises:

selecting, based on one or more bits of the digital signature, an ordering for instructions in a block of the software; and reordering the instructions in the block in accordance with the selected ordering.

6. A method as recited in claim 1, wherein the modifying comprises:

selecting, based on one or more bits of the digital signature, an ordering for basic blocks in an atomic execution unit of the software; and reordering the basic blocks in the atomic execution unit in accordance with the selected ordering.

7. A method as recited in claim 1, wherein the modifying comprises:

identifying, in an atomic execution unit of the software, one or more register assignments and a set of one or more registers affected by the one or more register assignments;

identifying a permutation of the set of one or more registers based on at least a portion of the digital signature; and for each instruction in the atomic execution unit where a new register is assigned, selecting a next register from the permutation of the set of one or more registers and replacing the new register with the next register.

8. A method as recited in claim 1, wherein the modifying comprises:

identifying a plurality of conditional branch instructions in the software, wherein the software has an execution flow when executed;

for each of the plurality of conditional branch instructions, using at least a portion of the digital signature to determine whether to change the conditional branch instruction; and for each conditional branch instruction that is to be changed, redirecting branches in the software to maintain the execution flow.

9. A method as recited in claim 1, wherein the modifying comprises:

generating an instruction for the software that will not alter a functionality of the software when the software is executed on the computing device; and adding, in an unused portion of the instruction, one or more bits of the digital signature.

10. A method as recited in claim 1, wherein the modifying comprises:

identifying a plurality of addition and subtraction instructions in the software, wherein each of the plurality of addition and subtraction instructions has an immediate operand;

for each of the plurality of addition and subtraction instructions, using at least a portion of the digital signature to determine one or more instructions for which the sign of the immediate operand of the instruction is to be toggled; and toggling the sign of the immediate operand of each of the determined one or more instructions.

11. One or more computer readable media having stored thereon a plurality of instructions that, when executed by one or more processors of a computing device, causes the one or more processors to:

generate a plurality of digital signatures for a software program; and embed the plurality of digital signatures in the software program in a manner allowing the plurality of digital signatures to be extracted and verified but also allowing the software program to be executed without any modification to the software program;

check an entropy of each of a plurality of atomic execution units of the software program; and prevent the software program from being installed on the computing device if an entropy threshold is not satisfied by one or more of the plurality of atomic execution units;

wherein the software program is run in a trusted mode if the plurality of digital signatures is verified and in a public mode if the signatures are not verified;

wherein one or more trusted resources of the computing device are available to the software program when the software program is run in the trusted mode and the one or more trusted resources of the computing device are not available to the software program when the software program is run in the public mode; and wherein the instructions that cause the one or more processors to embed the plurality of digital signatures in the software program further cause the one or more processors to:

select an atomic execution unit of the software program, wherein the atomic execution unit comprises a plurality of instructions of the software program;

generate, based on a key of the computing device, a digital signature for the atomic execution unit, wherein the digital signature for the atomic execution unit is one of the plurality of digital signatures;

add the digital signature for the atomic execution unit to the atomic execution unit; and add, as an instruction in the atomic execution unit immediately preceding the digital signature, a jump instruction so that when the atomic execution unit is executed the digital signature is not executed.

12. One or more computer readable media as recited in claim 11, wherein the instructions further cause the one or more processors to generate a digital signature for each of a plurality of atomic execution units of the software program, and to embed the digital signature for an atomic execution unit in the atomic execution unit.

13. One or more computer readable media as recited in claim 11, wherein the instructions that cause the one or more processors to embed the plurality of digital signatures in the software program further cause the one or more processors to:
    select, based on one or more bits of one of the plurality of digital signatures, an ordering for instructions in a block of instructions of the software program; and
    reorder the instructions in the block in accordance with the selected ordering.

14. One or more computer readable media as recited in claim 11, wherein the instructions that cause the one or more processors to embed the plurality of digital signatures in the software program further cause the one or more processors to:
    select, based on one or more bits of one of the plurality of digital signatures, an ordering for basic blocks of the software program; and
    reordering the basic blocks in accordance with the selected ordering.

15. One or more computer readable media as recited in claim 11, wherein the instructions that cause the one or more processors to embed the plurality of digital signatures in the software program further cause the one or more processors to:
    identify, in an atomic execution unit of the software program, one or more register assignments and a set of one or more registers affected by the one or more register assignments;
    identify a permutation of the set of one or more registers based on at least a portion of one of the plurality of digital signatures, wherein the one of the plurality of digital signatures is to be embedded in the atomic execution unit; and
    for each instruction in the atomic execution unit where a new register is assigned, select a next register from the permutation of the set of one or more registers and replace the new register with the next register.

16. One or more computer readable media as recited in claim 11, wherein the instructions that cause the one or more processors to embed the plurality of digital signatures in the software program further cause the one or more processors to:
    identify a plurality of conditional branch instructions in the software program, wherein the software program has an execution flow when executed;
    for each of the plurality of conditional branch instructions, use at least a portion of one of the plurality of digital signatures to determine whether to change the conditional branch instruction; and
    for each conditional branch instruction that is to be changed, redirect branches in the software to maintain the execution flow.

17. One or more computer readable media as recited in claim 11, wherein the instructions that cause the one or more processors to embed the plurality of digital signatures in the software program further cause the one or more processors to:
    generate an instruction for the software program that will not alter a functionality of the software program when the software program is executed on the computing device; and
    add, in an unused portion of the instruction, one or more bits of one of the plurality of digital signatures.

18. One or more computer readable media as recited in claim 11, wherein the instructions that cause the one or more processors to embed the plurality of digital signatures in the software program further cause the one or more processors to:
    identify a plurality of addition and subtraction instructions in the software program, wherein each of the plurality of addition and subtraction instructions has an immediate operand;
    for each of the plurality of addition and subtraction instructions, using at least a portion of one of the plurality of digital signatures to be embedded in the software program to determine one or more instructions for which the sign of the immediate operand of the instruction is to be toggled; and
    toggling the sign of the immediate operand of each of the determined one or more instructions.

19. A computing device comprising:
    an installer to install a software program on the computing device, the installer including:
        a signature module configured to generate, based on a key of the computing device, a digital signature for each of a plurality of atomic execution units of the software program, wherein each atomic execution unit includes a plurality of instructions of the software program; and
        a constraint embedding module configured to embed, in each of the plurality of atomic execution units, the digital signature for the atomic execution unit; and
    a verifier to verify during execution of the installed software program that the installed software program has not been altered since installation, the verifier including:
        a signature module configured to generate another digital signature, based on the key, for each of the plurality of atomic execution units; and
        a constraint verification module configured to extract the digital signature from each of the atomic execution units and compare the extracted digital signature to the other digital signature to determine whether the software program has been altered since being installed on the computing device;
    wherein the installer is configured to check an entropy of each of the plurality of atomic execution units of the software program and store the software program on the computing device only if an entropy threshold is satisfied by each of the atomic execution units; and
    wherein the constraint verification module is further configured to remove the digital signature from each of the atomic execution units before the instructions of the atomic execution unit are executed.

20. A computing device as recite in claim 19, wherein:
    the constraint embedding module is further configured to embed the digital signature in one of the atomic execution units by selecting, based on one or more bits of the digital signature for the one of the atomic execution units, an ordering for instructions in a block of the one of the atomic execution units, and reordering the instructions in the block in accordance with the selected ordering; and
    the constraint verification module is further configured to extract the digital signature from the one of the atomic execution units by identifying, based on the ordering of instructions in the block of the one of the atomic execution units, the one or more bits of the digital signature.

21. A computing device as recite in claim 19, wherein:
    the constraint embedding module is further configured to embed the digital signature in one of the atomic execution units by selecting, based on one or more bits of the digital signature to be embedded in the one of the atomic execution units, an ordering for basic blocks in the one of the atomic execution unit, and reordering the basic blocks in the one of the atomic execution units in accordance with the selected ordering; and the constraint verification module is further configured to extract the digital signature from the one of the atomic execution units by identifying, based on an ordering of basic blocks in the one of the atomic execution units, one or more bits of the digital signature.

22. A computing device as recite in claim 19, wherein:

the constraint embedding module is further configured to embed the digital signature in one of the atomic execution units by identifying, in the one of the atomic execution units, one or more register assignments and a set of one or more registers affected by the one or more register assignments, identifying a permutation of the set of one or more registers based on at least a portion of the digital signature to be embedded in the one of the atomic execution units, and for each instruction in the one of the atomic execution units where a new register is assigned, selecting a next register from the permutation of the set of one or more registers and replacing the new register with the next register; and the constraint verification module is further configured to extract the digital signature from the one of the atomic execution units by identifying one or more register assignments and a set of one or more registers affected by the one or more register assignments identifying, and identifying, based on a permutation of the set of one or more registers, one or more bits of the digital signature.

23. A computing device as recite in claim 19, wherein:

the constraint embedding module is further configured to embed the digital signature in one of the atomic execution units by identifying a plurality of conditional branch instructions in the one of the atomic execution units, wherein the one of the atomic execution units has an execution flow when executed, for each of the plurality of conditional branch instructions, using at least a portion of a digital signature to be embedded in the one of the atomic execution units to determine whether to change the conditional branch instruction, and for each conditional branch instruction that is to be changed, redirecting branches in the one of the atomic execution units to maintain the execution flow; and the constraint verification module is further configured to extract the digital signature from the one of the atomic execution units by identifying, based on the plurality of conditional branch instructions in the one of the atomic execution units, one or more bits of the digital signature.

24. A computing device as recite in claim 19, wherein:

the constraint embedding module is further configured to embed the digital signature in one of the atomic execution units by generating an instruction for the one of the atomic execution units that will not alter a functionality of the one of the atomic execution units when the one of the atomic execution units is executed on the computing device, and adding, in an unused field of the instruction, one or more bits of the digital signature to be embedded in the one of the atomic execution units; and the constraint verification module is further configured to extract the digital signature from the one of the atomic execution units by identifying, based on the unused field of the instruction in the one of the atomic execution units, one or more bits of the digital signature.

25. A computing device as recite in claim 19, wherein:

the constraint embedding module is further configured to embed the digital signature in one of the atomic execution units by identifying a plurality of addition and subtraction instructions in the one of the atomic execution units, wherein each of the plurality of addition and subtraction instructions has an immediate operand, for each of the plurality of addition and subtraction instructions, using at least a portion of the digital signature to be embedded in the one of the atomic execution units to determine one or more instructions for which the sign of the immediate operand of the instruction is to be toggled, and toggling the sign of the immediate operand of each of the determined one or more instructions; and the constraint verification module is further configured to extract the digital signature from the one of the atomic execution units by identifying, based on the plurality of addition and subtraction instructions in the software program, one or more bits of the digital signature.

* * * * *